(12) United States Patent
Choo et al.

(10) Patent No.: US 11,734,571 B2
(45) Date of Patent: Aug. 22, 2023

(54) METHOD AND APPARATUS FOR DETERMINING A BASE MODEL FOR TRANSFER LEARNING

(71) Applicant: SAMSUNG SDS CO., LTD., Seoul (KR)

(72) Inventors: Jin Ho Choo, Seoul (KR); Jeong Seon Yi, Seoul (KR); Min Ah Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 941 days.

(21) Appl. No.: 16/668,084

(22) Filed: Oct. 30, 2019

(65) Prior Publication Data

US 2020/0134469 A1 Apr. 30, 2020

(30) Foreign Application Priority Data

Oct. 30, 2018 (KR) .......... 10-2018-0130616

(51) Int. Cl.
*G06N 3/084* (2023.01)
(52) U.S. Cl.
CPC .................. *G06N 3/084* (2013.01)
(58) Field of Classification Search
CPC ........ G06N 3/0454; G06N 3/084; G06N 3/04; G06N 3/082
See application file for complete search history.

(56) References Cited

U.S. PATENT DOCUMENTS

| | | | |
|---|---|---|---|
| 2015/0254555 A1* | 9/2015 | Williams, Jr. ......... | G06N 3/045 706/14 |
| 2015/0301510 A1* | 10/2015 | Düll .................. | G06N 3/08 706/23 |
| 2016/0358099 A1 | 12/2016 | Sturlaugson et al. | |
| 2017/0038750 A1* | 2/2017 | Düll .................. | G05B 13/027 |
| 2018/0101757 A1* | 4/2018 | Harvey ............... | F41A 17/063 |
| 2018/0268244 A1* | 9/2018 | Moazzami ........... | G06V 20/176 |

(Continued)

FOREIGN PATENT DOCUMENTS

KR 10-2018-0025093 A 3/2018

OTHER PUBLICATIONS

Muhammad Jamal Afridi , "On automated source selection for transfer learning in convolutional neural networks," Jul. 26, 2017, Pattern Recognition 73 (2018),ScienceDirect,pp. 65-71.*

(Continued)

*Primary Examiner* — Omar S Ismail
(74) *Attorney, Agent, or Firm* — The PL Law Group, PLLC

(57) ABSTRACT

Methods and apparatuses for accurately determining a model, which is to be the basis of transfer learning, among a plurality of source models, are provided. According to an embodiment, an apparatus for determining a base model to be used for transfer learning to a target domain is provided. The apparatus comprises a memory which comprises one or more instructions and a processor which executes the instructions to construct a neural network model for measuring suitability of a plurality of pre-trained source models, measure the suitability of each of the source models by inputting data of the target domain to the neural network model, and determine the base model to be used for the transfer learning among the source models based on the suitability.

18 Claims, 18 Drawing Sheets

(56) References Cited

U.S. PATENT DOCUMENTS

| | | | | |
|---|---|---|---|---|
| 2018/0322623 | A1* | 11/2018 | Memo | G06N 3/084 |
| 2019/0050715 | A1* | 2/2019 | Ooi | G06F 16/00 |
| 2019/0108396 | A1* | 4/2019 | Dal Mutto | G06F 18/24 |
| 2020/0175961 | A1* | 6/2020 | Thomson | G10L 15/28 |

OTHER PUBLICATIONS

Kasthurirangan Gopalakrishnan, "Deep Convolutional Neural Networks with transfer learning for computer vision-based data-driven pavement distress detection," Sep. 23, 2017,Construction and Building Materials 157(2017),ScienceDirect, pp. 321-328.*

Xiaolin Li"A Transfer Learning Approach for Microstructure Reconstruction and Structure-property Predictions," Sep. 7, 2018 , Scientific Reports vol. 8, Article No. 13461 (2018),pp. 1-8.*

Office action dated Feb. 21, 2022 from Korean Patent Office in a counterpart Korean Patent Application No. 10-2018-0130616 (English translation is also submitted herewith.).

Joon-Choul Shin et al., "A Stage Transition Model for Korean Part-of-Speech and Homograph Tagging", Journal of KISS : Software and Applications 39(11), 2012.11, pp. 889-901 (English translation of abstract is included in the second page.).

* cited by examiner

METHOD AND APPARATUS FOR DETERMINING A BASE MODEL FOR TRANSFER LEARNING

CROSS REFERENCE TO RELATED APPLICATIONS AND CLAIM OF PRIORITY

This application claims the benefit of Korean Patent Application No. 10-2018-0130616, filed on Oct. 30, 2018, in the Korean Intellectual Property Office, the disclosure of which is incorporated herein by reference in its entirety.

BACKGROUND

1. Field of the Disclosure

The present disclosure relates to a method and apparatus for determining a base model for transfer learning, and more particularly, to a method and apparatus for determining a model, which is most suitable for transfer learning to a target domain among a plurality of pre-trained source models, as a base model of the transfer learning in order to improve the effect of the transfer learning.

2. Description of the Related Art

Most machine learning techniques are efficient only when a training dataset and an actual dataset have the same characteristics and distribution. Therefore, when a target domain or a target task is changed, a training dataset for the target domain or the target task must be collected or generated again to construct a new machine learning model.

In some domains of the real world, however, it is very expensive or impossible to collect or generate (e.g., label) a new training dataset. For example, assume that a model for predicting the location of a lesion from a radiographic image of a patient is constructed in a medical domain. In this case, it is impossible to secure a training dataset of the prediction model because a large number of radiographic images tagged with the locations of lesions hardly exist in the medical domain. In addition, help from an expert such as a radiologist is essential to tag the location of a lesion in a radiographic image. Therefore, it is very expensive to generate a training dataset.

To reduce the cost of collecting or generating a new training dataset, knowledge transfer or transfer learning may be utilized.

Referring to FIGS. 1 and 2, a general machine learning technique constructs models 5 and 7 to be applied to domains by using datasets 1 and 3 belonging to the domains, respectively. On the other hand, transfer learning is different from the general machine learning technique in that knowledge (e.g., a learned weight value) of a source model 15 pre-trained using a dataset 11 of a domain is transferred to construct a target model 17 to be applied to a target domain.

After transfer learning is performed, the target model 17 may be fine-tuned using a dataset 13 belonging to the target domain in order to improve the performance of the target model 17. Here, since the fine-tuning is possible even with a small dataset 13, utilizing the transfer learning can dramatically reduce the cost of labeling.

While there is the above advantage, there are also clear limitations of transfer learning, which are that the performance of a target model is heavily dependent on a pre-trained source model. That is, if the target model is constructed based on a source model which is not suitable for a target domain, the performance of the target model may be greatly reduced.

However, when there is a plurality of source models, it is not easy to determine which source model is most suitable for the target domain. A conventional approach to solving this problem is a naïve method of attempting training using all source models as base models. That is, in the conventional method, each source model is additionally trained (e.g., fine-tuned), performance evaluation is performed using a dataset of the target domain, and then a source model exhibiting the best performance is utilized as a target model.

However, the above conventional method requires too much time and computing cost to additionally train all source models. Above all, when a source model evaluated as having superior performance is applied to the target domain, the expected performance is often not exhibited.

Therefore, it is required to come up with a method of constructing a better-performing target model at a lower cost in an environment in which a plurality of source models exist by accurately selecting a source model which is most suitable for a target domain.

SUMMARY

Aspects of the present disclosure provide a method and apparatus for accurately determining a model, which is to be the basis of transfer learning, among a plurality of source models.

Aspects of the present disclosure also provide a method and apparatus for constructing a neural network model, which measures transfer learning suitability of a pre-trained source model, in order to accurately determine the base model.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a method of determining a base model to be used for transfer learning to a target domain by a computing apparatus. The method comprises constructing a neural network model for measuring suitability of a plurality of pre-trained source models, measuring the suitability of each of the source models by inputting data of the target domain to the neural network model, and determining the base model to be used for the transfer learning among the source models based on the suitability.

According to an embodiment, the constructing of the neural network model may comprise extracting a feature value of training data in conjunction with a feature extraction layer of a first source model and adjusting a weight of the neural network model by learning the feature value as preset first suitability. The adjusting of the weight of the neural network model may comprise obtaining a result value of the first source model by inputting the feature value to an output layer of the first source model and adjusting the weight of the neural network model by learning the feature value and the result value as the first suitability. The adjusting of the weight of the neural network model also may comprise obtaining predicted suitability for the feature value by inputting the feature value to the neural network model and adjusting the weight of the neural network model by back-propagating an error between the first suitability and the predicted suitability. A weight of the feature extraction layer may not be adjusted through the back-propagating of the error.

According to an embodiment, the constructing of the neural network model may comprise adjusting a weight of the neural network model by learning first data previously learned by a first source model as first suitability and adjusting the weight of the neural network model by learning second data not learned by the first source model as second suitability. The first suitability may set to a greater value than the second suitability.

According to an embodiment, the constructing of the neural network model may comprise constructing a first neural network model for measuring suitability of a first source model constructing a second neural network model for measuring suitability of a second source model. The constructing of the first neural network model may comprise extracting a first feature of first data in conjunction with a first feature extraction layer of the first source model, adjusting a weight of the first neural network model by learning the first feature as first suitability, extracting a second feature of second data in conjunction with a second feature extraction layer of the second source model, and adjusting the weight of the first neural network model by learning the second feature as second suitability. The first data may be data previously learned by the first source model, the second data may be data previously learned by the second source model, and the first suitability may be set to a greater value than the second suitability.

According to an embodiment, the constructing of the neural network model may comprise extracting a plurality of feature values of training data in conjunction with respective feature extraction layers of the source models, aggregating the feature values, and adjusting a weight of the neural network model by learning the aggregated feature values as suitability preset in the training data. The preset suitability comprises suitability of each of the source models. Each of the feature extraction layers may comprise a first sub-layer and a second sub-layer. The aggregating of the feature values may comprise aggregating a plurality of first feature values extracted by the respective first sub-layers of the source models and aggregating a plurality of second feature values extracted by the respective second sub-layers of the source models, and the adjusting of the weight of the neural network model may comprise adjusting a weight of a first neural network model which corresponds to the first sub-layers by learning the aggregated first feature values and adjusting a weight of a second neural network model which corresponds to the second sub-layers by learning the aggregated second feature values. The determining of the base model may comprise determining a first base layer among the first sub-layers of the source models based on suitability measured by the first neural network model and determining a second base layer among the second sub-layers of the source models based on suitability measured by the second neural network model, and further comprising constructing a target model, which is to be applied to the target domain, by using the first base layer and the second base layer.

According to an embodiment, the method of determining a base model to be used for transfer learning to a target domain by a computing apparatus, may further comprise constructing a target model, which is to be applied to the target domain, by fine-tuning the base model using a dataset of the target domain.

According to another aspect of the present disclosure, there is provided a method of constructing a neural network model for measuring suitability of a pre-trained source model by using a computing apparatus. The method may comprise obtaining a training dataset which comprises first data previously learned by the source model and second data not learned by the source model, adjusting a weight of the neural network model by learning the first data as first suitability, and adjusting the weight of the neural network model by learning the second data as second suitability. The first suitability may set to a greater value than the second suitability.

According to an embodiment, the adjusting of the neural network model by learning the first data as the first suitability may comprise extracting a feature value of the first data in conjunction with a feature extraction layer of the source model, obtaining predicted suitability for the feature value by inputting the feature value to the neural network model, and adjusting the weight of the neural network model by back-propagating an error between the first suitability and the predicted suitability. The feature extraction layer may comprise a convolutional layer. A weight of the feature extraction layer may not be adjusted through the back-propagating of the error. The obtaining of the predicted suitability for the feature value may comprise obtaining a result value of the source model by inputting the feature value to an output layer of the source model and obtaining the predicted suitability by inputting the feature value and the result value to the neural network model.

According to an embodiment, the source model may be a first source model, the training dataset may further comprise third data previously learned by a second source model, and the adjusting of the weight of the neural network model by learning the first data as the first suitability may comprise adjusting the weight of the neural network model by learning a feature of the first data extracted by a feature extraction layer of the first source model as the first suitability and may further comprise adjusting the weight of the neural network model by learning a feature of the third data extracted by a feature extraction layer of the second source model as third suitability, wherein the first suitability is set to a higher value than the third suitability.

According to an embodiment, the source model may be a first source model, and may further comprise adjusting the weight of the neural network model by learning a feature of the first data extracted by a feature extraction layer of a second source model as third suitability, wherein the first suitability is set to a higher value than the third suitability.

According to an embodiment, the source model may be a first source model, the first suitability comprises (1-1)-th suitability set for the first source model and (1-2)-th suitability set for a second source model, and the adjusting of the weight of the neural network model by learning the first data as the first suitability may comprise extracting a first feature value of the first data by using a feature extraction layer of the first source model, extracting a second feature value of the first data by using a feature extraction layer of the second source model, aggregating the first feature value and the second feature value, and adjusting the weight of the neural network model by learning the aggregated feature values as the first suitability. The (1-1)-th suitability may be set to a higher value than the (1-2)-th suitability.

According to still another aspect of the present disclosure, there is provided an apparatus for determining a base model to be used for transfer learning to a target domain. The apparatus may comprise a memory which comprises one or more instructions and a processor which executes the instructions to construct a neural network model for measuring suitability of a plurality of pre-trained source models, measure the suitability of each of the source models by inputting data of the target domain to the neural network model, and determine the base model to be used for the transfer learning among the source models based on the suitability.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EMBODIMENTS

Figure 1:
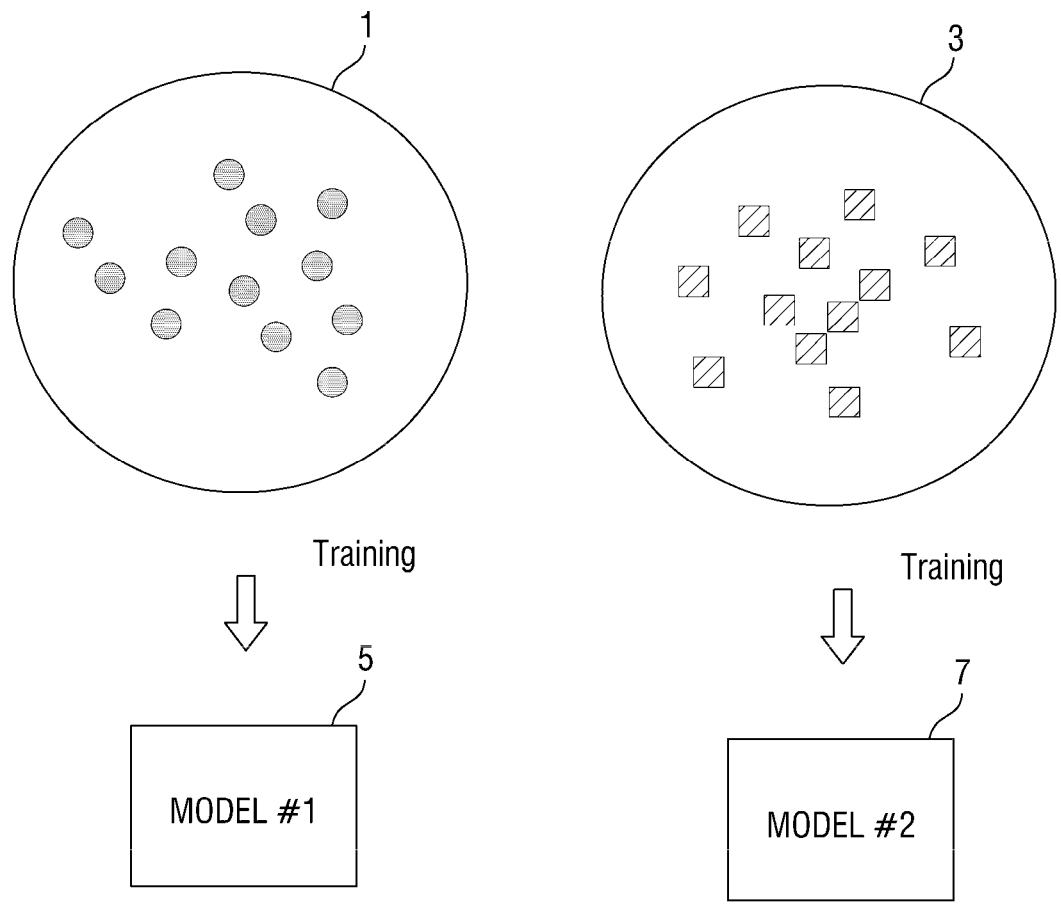
FIGS. 1 and 2 are diagrams for explaining the concept of transfer learning.
Figure 2:
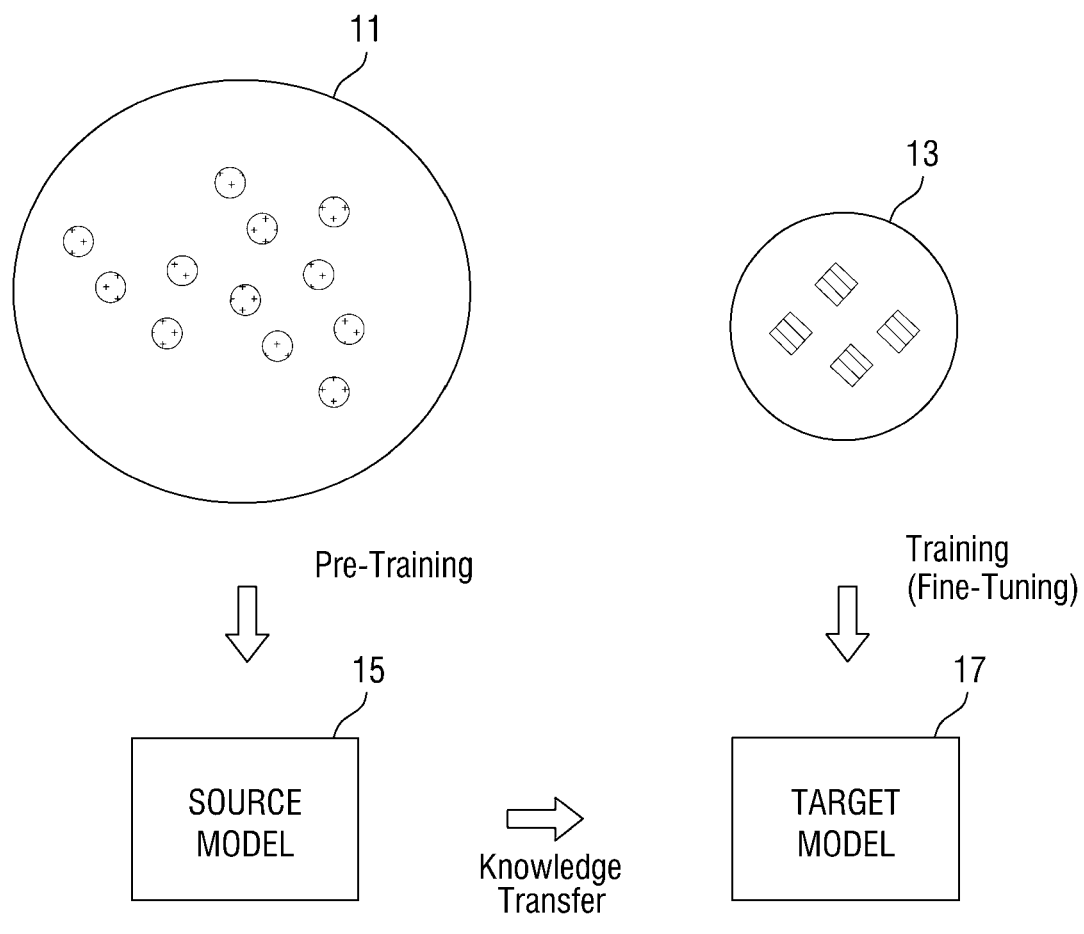

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Prior to the description of the present specification, some terms used herein will be clarified.

A source domain, as used herein, is a source domain of transfer learning. That is, knowledge learned in the source domain may be transferred to a target domain through transfer learning. Generally, the source domain may be a domain that can easily secure a plurality of training datasets, but the technical scope of the present disclosure is not limited thereto.

A source model, as used herein, is a pre-trained model constructed by learning a dataset belonging to the source domain.

A target domain, as used herein, is a destination domain of transfer learning and a domain in which a target task is to be performed through transfer learning. That is, knowledge learned in the source domain may be transferred to the target domain through transfer learning. Generally, the target domain may be a domain (such as a medical domain) that cannot easily secure training datasets, but the technical scope of the present disclosure is not limited thereto. For example, even for a domain that can easily secure training datasets, transfer learning may be used to reduce the time and computing cost required for learning or may be used for testing purposes.

A target dataset, as used herein, is a dataset belonging to the target domain. The target dataset may be used to determine a base model of transfer learning among a plurality of source models or to additionally train (e.g., fine-tune) a target model.

A target model, as used herein, is a model that performs a target task (e.g., a classification task) in the target domain and a model to be constructed through transfer learning.

An instruction, as used herein, is a series of commands bundled together based on function, is a component of a computer program, and is executed by a processor.

Hereinafter, embodiments of the present disclosure will be described in detail with reference to the attached drawings.

Figure 3:
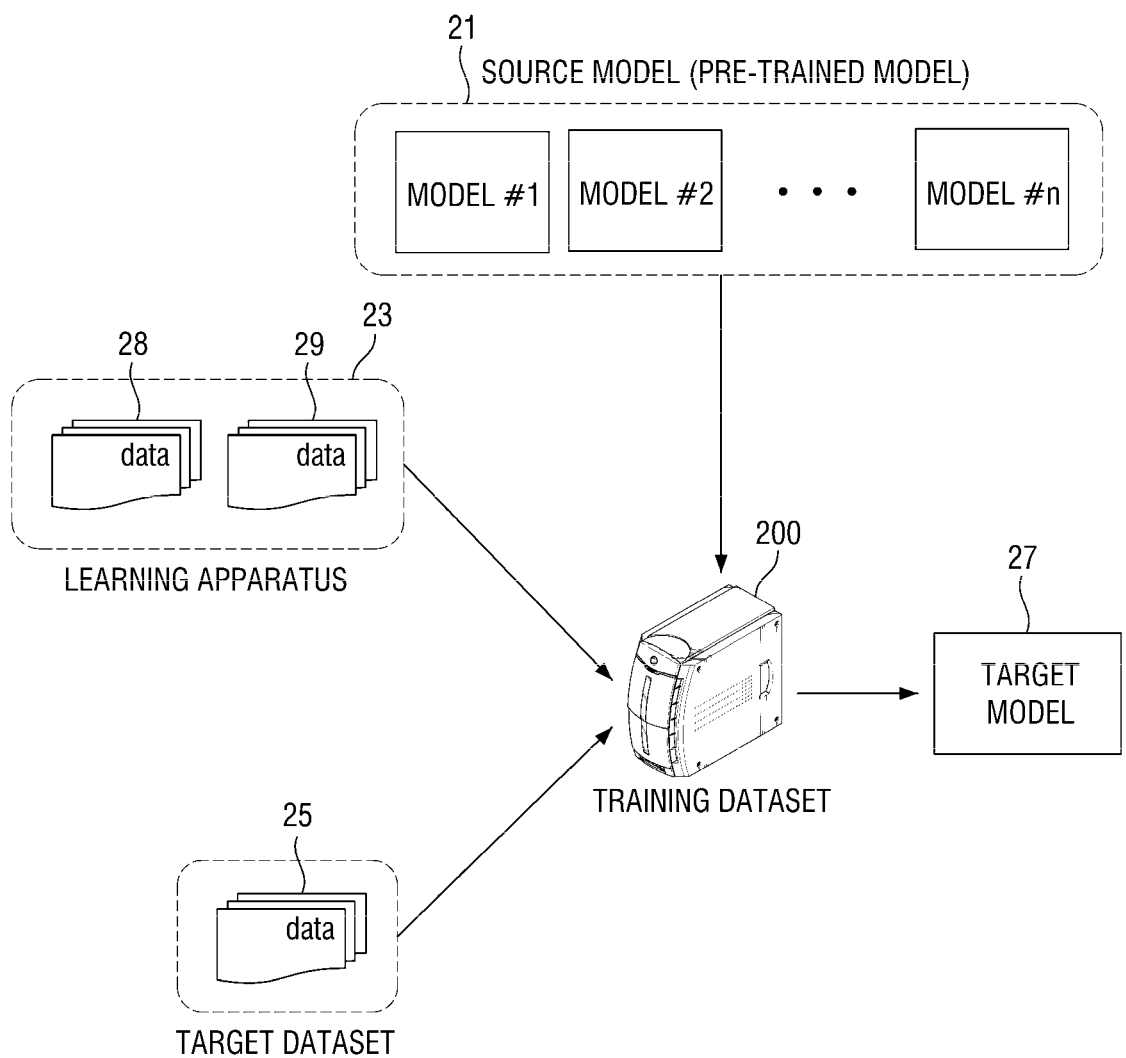
FIG. 3 schematically illustrates inputs and outputs of a learning apparatus according to an embodiment.

FIG. 3 schematically illustrates inputs and outputs of a learning apparatus 200 according to an embodiment.

Figure 18:
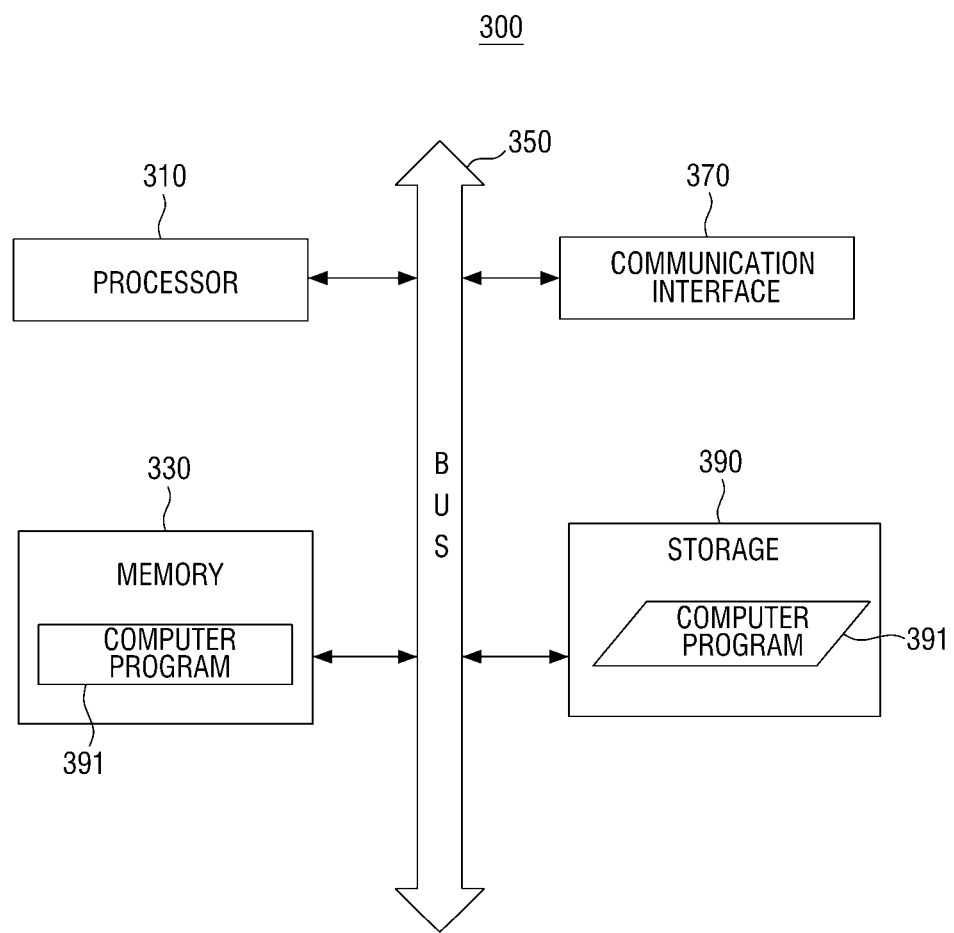
FIG. 18 illustrates the hardware configuration of an example computing apparatus that can implement the learning apparatus according to the embodiment.

Referring to FIG. 3, the learning apparatus 200 is a computing apparatus that constructs a target model 27 from a plurality of source models 21 through transfer learning. Here, the computing apparatus may be a notebook computer, a desktop computer, a laptop computer, or the like. However, the computing apparatus is not limited to these examples and may be any type of apparatus having a computing function. An example of the computing apparatus is illustrated in FIG. 18.

More specifically, the learning apparatus 200 may construct the target model 27 by using the source models 21, a training dataset 23, and a target dataset 25 as inputs.

According to an embodiment, the learning apparatus 200 may construct a neural network model (hereinafter, referred to as a "suitability measurement model") which measures transfer learning suitability (hereinafter, shortened to "suitability") of each source model by using the source models 21 and the training dataset 23. Here, the training dataset 23 includes first data used in pre-training of the source models 21 and second data not used in the pre-training of the source models 21. More specifically, the learning apparatus 200 may construct a suitability measurement model for a first source model by learning the first data as a high suitability value and learning the second data as a low suitability value. The constructed suitability measurement model outputs a high suitability value when receiving data having similar characteristics to the first data and outputs a low suitability value in the opposite case. Therefore, the suitability measurement model can determine whether the target dataset 25 has similar characteristics to the first data (that is, determine how suitable the first source model is for transfer learning). In this embodiment only, the learning apparatus 200 may also be referred to as a neural network model construction apparatus 200. This embodiment will be described in detail later with reference to FIGS. 4 and 6 through 17.

In addition, according to an embodiment, the learning apparatus 200 may determine a base model, which is to be the basis of the target model 27, among the source models 21 by using the suitability measurement model constructed according to the above-described embodiment. For example, the learning apparatus 200 may measure the suitability of each of the source models 21 using the suitability measurement model and determine a source model having a highest suitability value as the base model. In this embodiment only, the learning apparatus 200 may also be referred to as a base model determination apparatus 200. This embodiment will be described in detail later with reference to FIGS. 4 and 5.

The configuration and operation of the learning apparatus 200 will be described in more detail later with reference to FIG. 4 and subsequent drawings.

For reference, although the learning apparatus 200 is implemented as one physical computing apparatus in FIG. 3, in an actual physical environment, a first function of the learning apparatus 200 may be implemented in a computing apparatus, and a second function may be implemented in a second computing apparatus.

In addition, for rapid processing of processes, the learning apparatus 200 may perform parallel processing by using a plurality of processors (e.g., graphics processing units (GPUs)) or may be implemented as a distributed system including a plurality of computing apparatuses.

Until now, the inputs and outputs of the learning apparatus 200 according to the embodiment have described with reference to FIG. 3. The configuration and operation of the learning apparatus 200 will now be described with reference to FIG. 4.

Figure 4:
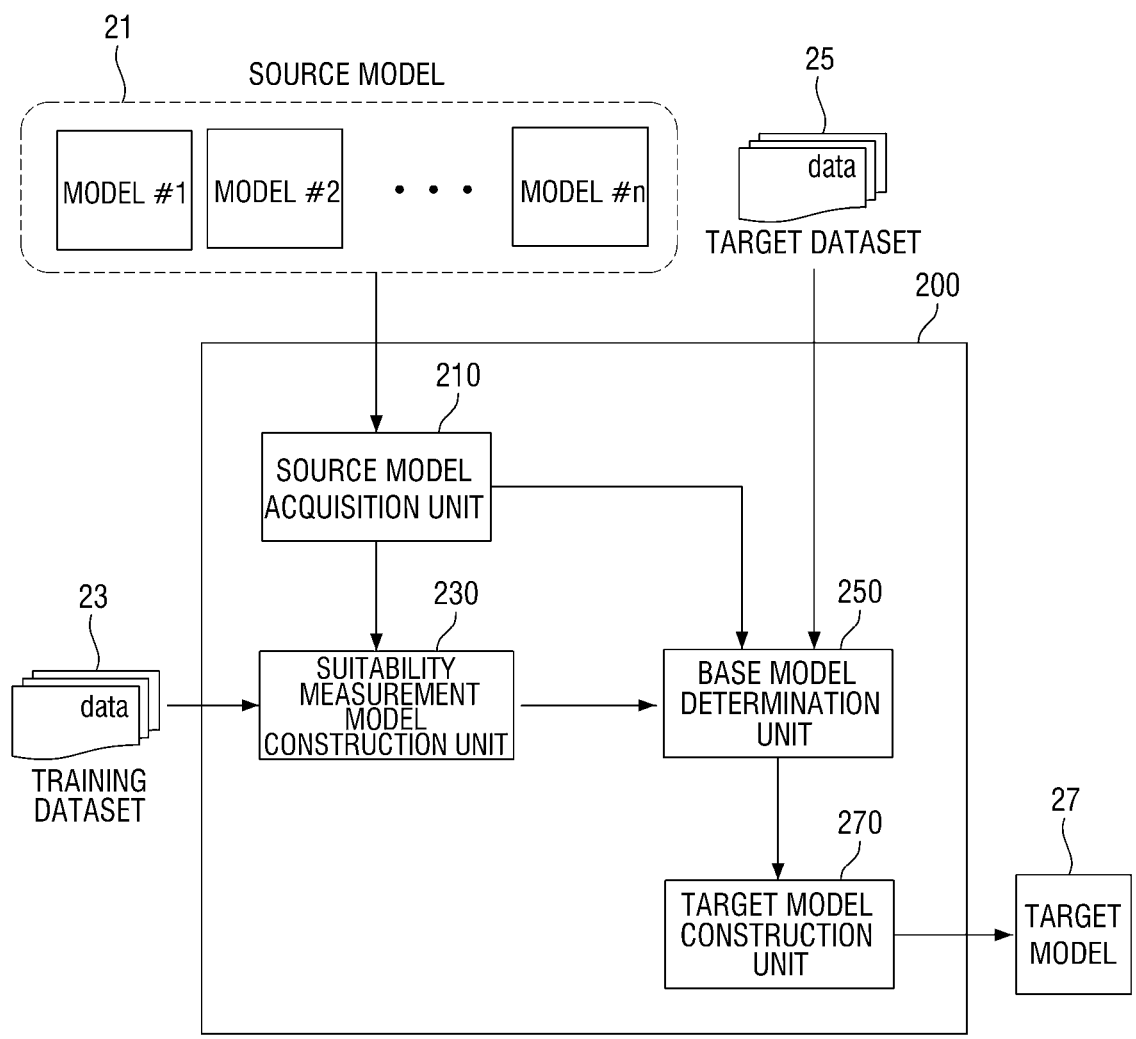
FIG. 4 is a block diagram of the learning apparatus according to the embodiment.

FIG. 4 is a block diagram of the learning apparatus 200 according to the embodiment.

Referring to FIG. 4, the learning apparatus 200 may include a source model acquisition unit 210, a suitability measurement model construction unit 230, a base model determination unit 250, and a target model construction unit 270. In FIG. 4, only the components related to the embodiment are illustrated. Therefore, it will be understood by those of ordinary skill in the art to which the present disclosure pertains that other general-purpose components can be included in addition to the components illustrated in FIG. 4. Further, it should be noted that the components of the learnt g apparatus 200 illustrated in FIG. 4 are functionally distinct components and that a plurality of components can be integrated with each other in an actual physical environment. Each component of the learning apparatus 200 now be described.

The source model acquisition unit 210 acquires a plurality of pre-trained source models 21. The source model acquisition unit 210 can acquire the source models 21 using any method. According to an embodiment, the source model acquisition unit 210 itself may construct the source models 21 by learning datasets of a source domain.

Next, the suitability measurement model construction unit 230 constructs a suitability measurement model which can measure the suitability of each source model 21 for a target domain. Various embodiments regarding the structure of the suitability measurement model and a method of constructing the suitability measurement model will be described in detail later with reference to FIGS. 7 through 17.

Next, the base model determination unit 250 determines a base model, which is to be the basis of a target model 27, among the source models 21 by using the suitability measurement model. More specifically, the base model determination unit 250 measures the suitability of each of the source models 21 by inputting a target dataset 25 associated with a target task to the suitability measurement model. In addition, the base model determination unit 250 determines the base model of the target model 27 based on the suitability of each of the source models 21.

As described above, the suitability is a value indicating how suitable each source model 21 is for transfer learning to the target domain. When a specific source model is suitable for transfer learning, it means that the specific source model has been pre-trained using data having similar characteristics to the target dataset 25.

Next, the target model construction unit 270 constructs the target model 27, which is to perform the target task, based on the determined base model. For example, the target model construction unit 270 may construct the target model 27 by fine-tuning the base model using the target dataset 25.

It should be noted that not all components illustrated in FIG. 4 are essential components to implement the learning apparatus 200. For example, a learning apparatus 200 according to an embodiment may be implemented using only some of the components illustrated in FIG. 4.

In addition, a first component among the components illustrated in FIG. 4 may be implemented as a first computing apparatus, and a second component may be implemented as a second computing apparatus. For example, the source model acquisition unit 210 and the target model construction unit 270 may be implemented as separate computing apparatuses.

Each component of the learning apparatus 200 illustrated in FIG. 4 may mean, but is not limited to, a software or hardware component such as a Field Programmable Gate Array (FPGA) or Application Specific Integrated Circuit (ASIC). A component may advantageously be configured to reside on the addressable storage medium and configured to execute on one or more processors. The functionality provided for in the components may be combined into fewer components or further separated into additional components.

Methods according to various embodiments will now be described with reference to FIGS. 5 through 17.

Each operation of the methods according to the various embodiments to be described below may be performed by a computing apparatus. In other words, each operation of the methods may be implemented as one or more instructions to be executed by a processor of a computing apparatus. All operations included in the methods may be executed by one physical computing apparatus. Alternatively, first operations of the methods may be performed by a first computing apparatus, and second operations of the methods may be performed by a second computing apparatus. For ease of description, it will hereinafter be assumed that each operation of the methods is performed by the learning apparatus 200.

Figure 5:
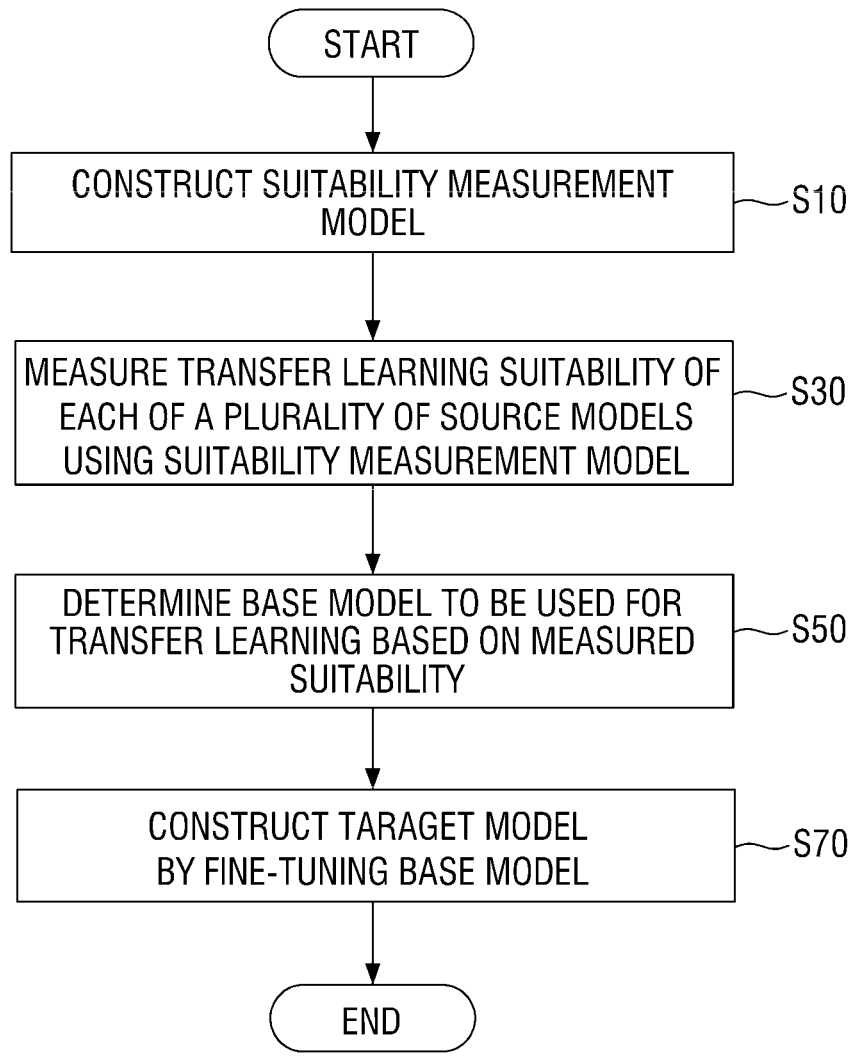
FIG. 5 is a flowchart illustrating a method of determining a base model for transfer learning according to an embodiment.

FIG. 5 is a flowchart illustrating a method of determining a base model for transfer learning according to an embodiment. However, this is merely an embodiment for achieving the objectives of the present disclosure and some operations can be added or deleted as needed.

Referring to FIG. 5, the method of determining the base model starts with operation S10 in which a suitability measurement model is constructed. As described above, the suitability measurement model denotes a neural network model that measures the suitability of each source model.

A specific method of constructing the suitability measurement model in operation S10 may vary depending on embodiments. This will be described in detail later with reference to FIGS. 6 through 17.

In operation S30, the learning apparatus 200 measures the suitability of each of a plurality of source models by using the suitability measurement model. Specifically, the learning apparatus 200 measures the suitability of each source model by inputting a given target dataset (e.g., 25 in FIG. 3) to the suitability measurement model. Here, the measured suitability may be a confidence score output from the suitability measurement model or a value processed based on the confidence score.

In some embodiments, when the target dataset is composed of a plurality of data, the learning apparatus 200 may calculate the final suitability of each source model by calculating the average or weighted average of suitability values for the data. Here, a weight used for the weighted average may be differentially determined according to the quality (e.g., resolution), type, importance, etc. of the data. For example, a higher weight may be given to high-quality data or important data. For another example, when first data is original data of a target domain and second data is processed data generated by applying an augmentation technique to the original data, a higher weight may be given to the first data. Examples of the data augmentation technique may include cropping, rotating, flipping, jittering, and scaling.

In operation S50, the learning apparatus 200 determines a base model to be used for transfer learning based on the measured suitability. More specifically, the learning apparatus 200 may determine a source model satisfying a specified condition as the base model, and the specified condition may vary depending on embodiments. For example, the learning apparatus 200 may determine a source model having highest suitability, a source model whose suitability is equal to or greater than a threshold, or top n (where n is a natural number of 1 or more) source models having high suitability as the base model.

When a plurality of base models are determined based on the specified condition, the learning apparatus 200 may construct a plurality of candidate models using each of the base models and determine a target model to be actually utilized in the target domain through performance evaluation (e.g., cross-validation) of the candidate models.

In some embodiments, the learning apparatus 200 may further perform operation S70.

In operation S70, the learning apparatus 200 constructs a target model by fine-tuning the base model using a target dataset (e.g., 25 in FIG. 3). The target model is a machine learning model that will perform a target task in the target domain as described above. The target dataset in operation S70 may be at least partially the same as or may be different from the dataset input to measure the suitability in operation S30.

For reference, of operations S10 through S70 described above, operation S10 may be executed by the suitability measurement model construction unit 230, operations S30 and S50 may be executed by the base model determination unit 250, and operation S70 may be executed by the target model construction unit 270.

Until now, the method of determining the base model for transfer learning according to the embodiment has been described with reference to FIG. 5. According to the above-described method, the base model may be determined based on the measured suitability of each source model. Therefore, the inefficiency of attempting to construct target models for all source models as in the conventional art can be removed. Further, since a source model which has learned a dataset having similar characteristics to a target dataset is determined as the base model of transfer learning based on suitability, a high-performance target model can be constructed at low cost.

Various embodiments associated with a method of constructing a suitability measurement model in operation S10 will now be described with reference to FIGS. 6 through 17.

Figure 6:
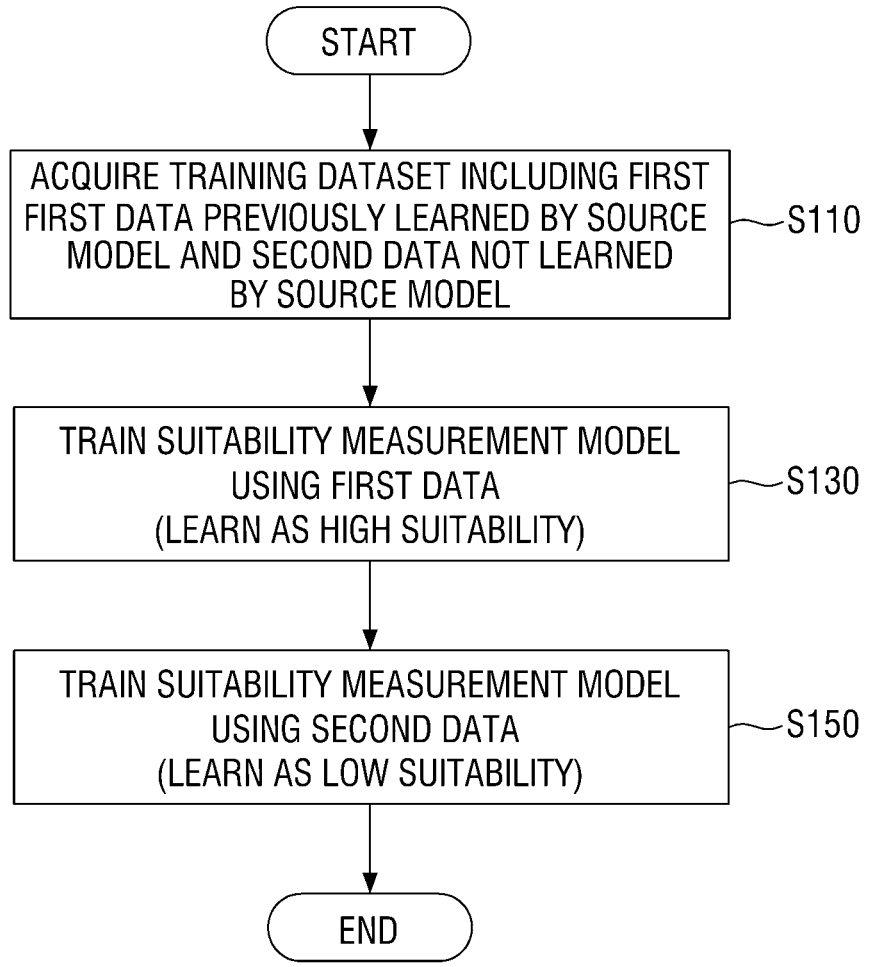
FIG. 6 is a flowchart illustrating a method of constructing a neural network model for measuring transfer learning suitability according to an embodiment.

FIG. 6 is a flowchart illustrating a basic flow of a method of constructing a neural network model for measuring transfer learning suitability according to an embodiment.

Referring to FIG. 6, the basic principle of constructing a suitability measurement model is to learn first data previously learned by a specific source model and second data not learned by the specific source model as different suitability values. Through the learning, the suitability measurement model may become able to measure whether a given target dataset is similar to the data learned by the specific source model. In addition, if the data learned by the specific source model is similar to the target dataset, it means that the specific source model is suitable for transfer learning. Therefore, an output value of the suitability measurement model can be utilized as the transfer learning suitability.

Specifically, referring to FIG. 6, the method of constructing the neural network model starts with operation S110 in which a training dataset is acquired. Here, the training dataset includes first data used for pre-training of a source model and second data not used for the pre-training of the source model.

In operation S130, a suitability measurement model is trained using the first data. For example, if the first data is data previously learned by a first source model and a first suitability measurement model for the first source model is to be constructed, the learning apparatus 200 learns the first data as relatively high suitability (e.g., 1). Accordingly, the first suitability measurement model outputs a high suitability value for a target dataset having similar characteristics to the first data.

In operation S150, the suitability measurement model is trained using the second data. For example, if the second data is data not previously learned by the first source model and the first suitability measurement model for the first source model is to be constructed, the learning apparatus 200 learns the second data as relatively low suitability (e.g., 0). Accordingly, the first suitability measurement model outputs a low suitability value for a target dataset having characteristics similar to those of the second data.

The suitability measurement model may be constructed by repeatedly performing operations S130 and S150 for all training datasets.

Operations S110 through S150 described above show only a basic flow for constructing a suitability measurement model, and a detailed process of constructing the suitability measurement model varies depending on the structure of the model. For ease of understanding, a method of constructing each model will be described in detail with reference to the structures of suitability measurement models illustrated in FIGS. 7 through 17.

According to various embodiments, a suitability measurement model may be constructed for each source model (that is, a one-to-one relationship) or may be constructed to measure suitability of a plurality of source models at a time (that is, a many-to-one relationship). First, embodiments of constructing a suitability measurement model for each source model will be described with reference to FIGS. 7 through 15.

A suitability measurement model and a process of constructing the suitability measurement model according to a first embodiment will now be described with reference to FIGS. 7 through 11.

Figure 7:
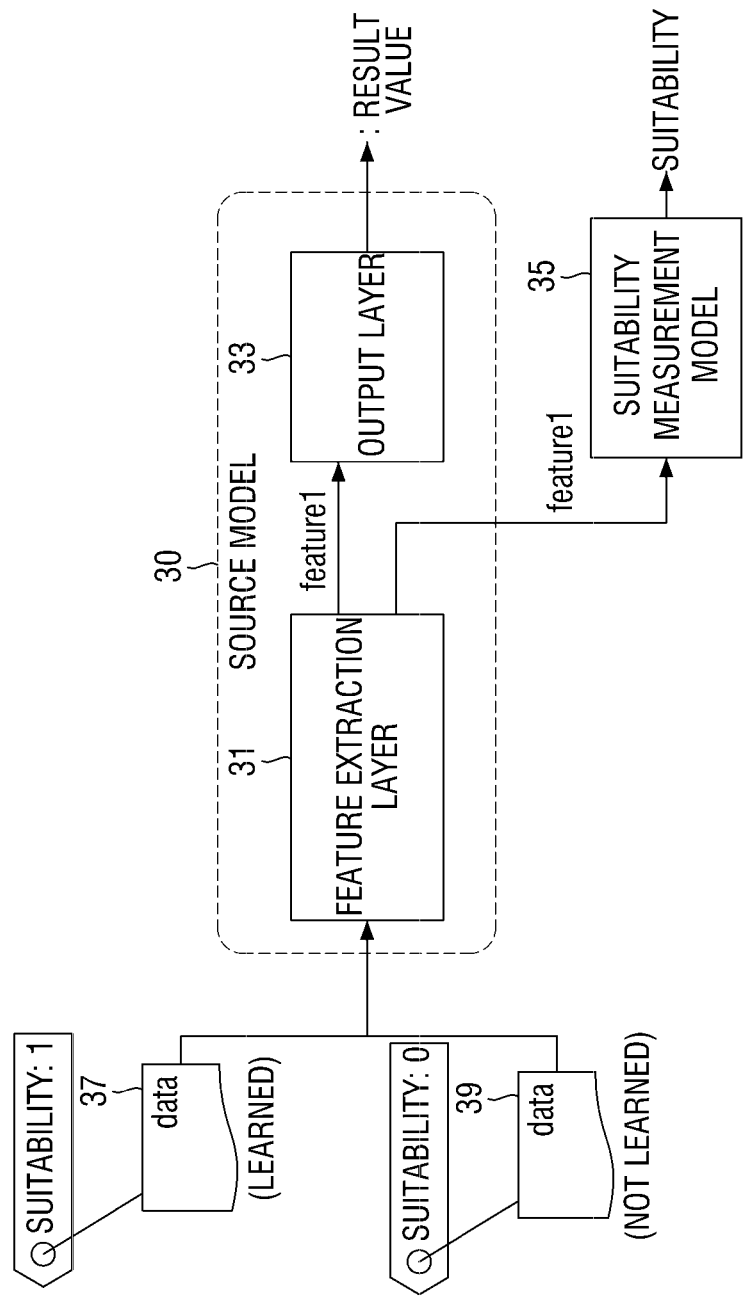
FIGS. 7 through 11 illustrate a suitability measurement model and a process of constructing the suitability measurement model according to a first embodiment.

FIG. 7 illustrates a basic training structure of a suitability measurement model 35 according to an embodiment.

Referring to FIG. 7, the suitability measurement model 35 may be trained using a source model 30 and a dataset 37 and 39. Here, the source model 30 is used to extract a feature value from the dataset 37 and 39. For ease of understanding, the source model 30 will be briefly described below.

The source model 30 is a machine learning model including a feature extraction layer 31 and an output layer 33. The feature extraction layer 31 is layer for extracting a feature from input data. The feature to be extracted is automatically determined through machine learning of a given training dataset. That is, as a weight of the feature extraction layer 31 is adjusted and updated through learning, the feature extraction layer 31 may automatically extract an optimal feature for performing a specific task.

The output layer 33 is a layer for outputting a result value of the specific task based on the feature extracted by the feature extraction layer 31. For example, when the first source model 30 is a model that performs a classification task, the result value may be a confidence score for each class indicating a classification result.

Figure 8:
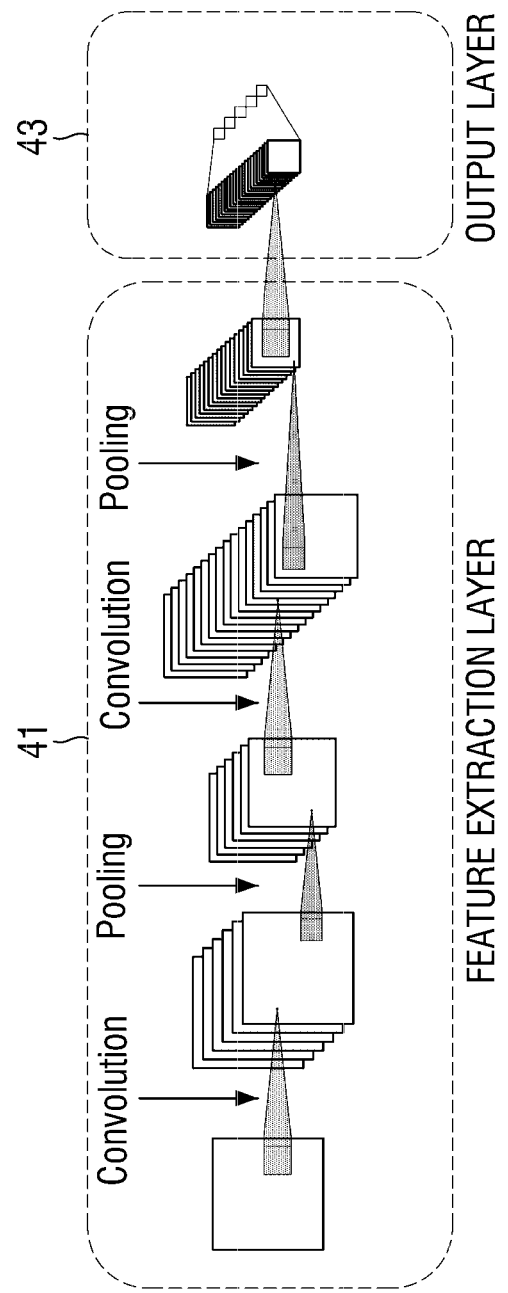
Figure 9:
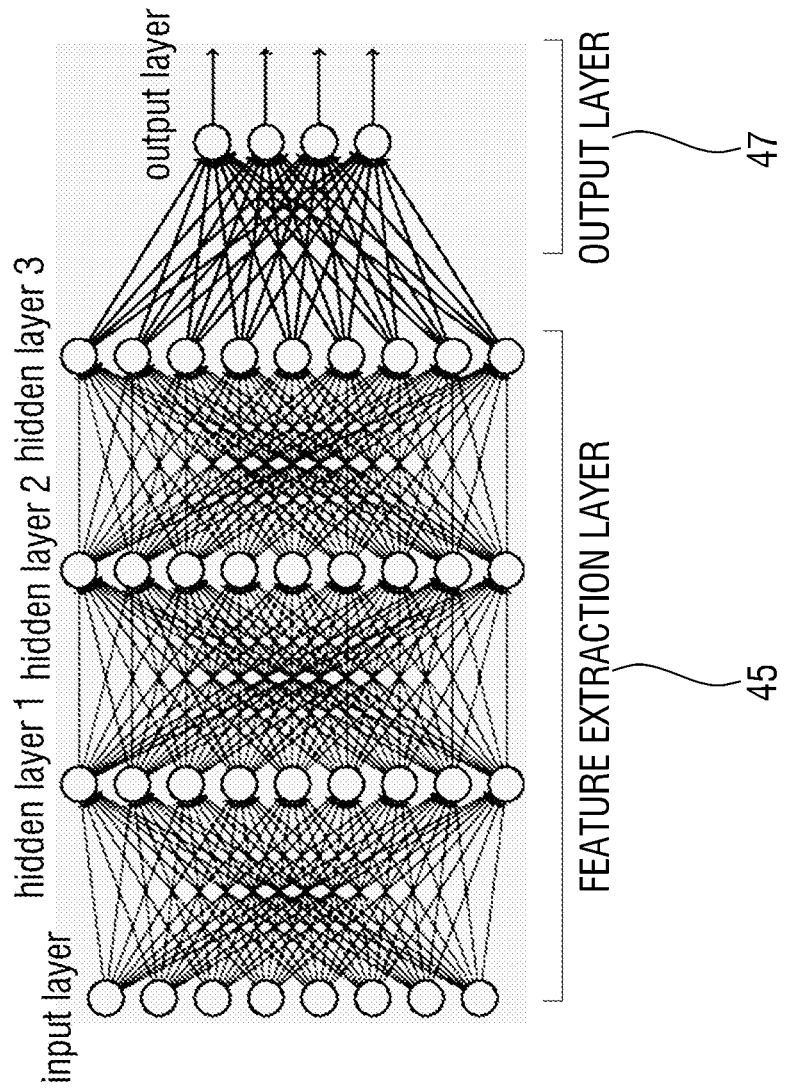

Some examples of the feature extraction layer 31 and the output layer 33 are illustrated in FIGS. 8 and 9.

In an example, referring to FIG. 8, when the source model 30 is a convolutional neural network model, the feature extraction layer 31 may be a layer 41 that extracts a feature map or an activation map from an input image through a convolution operation. Here, the layer 41 may include at least one convolutional layer and at least one pooling layer. In addition, the output layer 33 may be a layer 43 that outputs a confidence score for each class by aggregating feature maps through an operation such as softmax.

In another example, referring to FIG. 9, when the source model 30 is an artificial neural network model, the feature extraction layer 31 may be at least one hidden layer 45 that extracts a feature from input data. In addition, the output layer 33 may be a layer 47 that outputs a result value based on the feature extracted by the hidden layer 45. Here, the result value may be a confidence score for each class indicating a classification result or may be a regression value.

Referring again to FIG. 7, the dataset 37 and 39 may be composed of first data 37 previously learned by the source model 30 and second data 39 not learned by the source model 30. By learning the two types of data 37 and 39 as different suitability values, the suitability measurement model 35 may become able to measure how similar input data is to the data learned by the first source model 30.

In some embodiments, a training dataset of the suitability measurement model 35 may be generated by configuring the number of the first data 37 and the number of the second data 39 at a preset ratio. Accordingly, the learning performance of the suitability measurement model 35 can be further improved.

Figure 10:
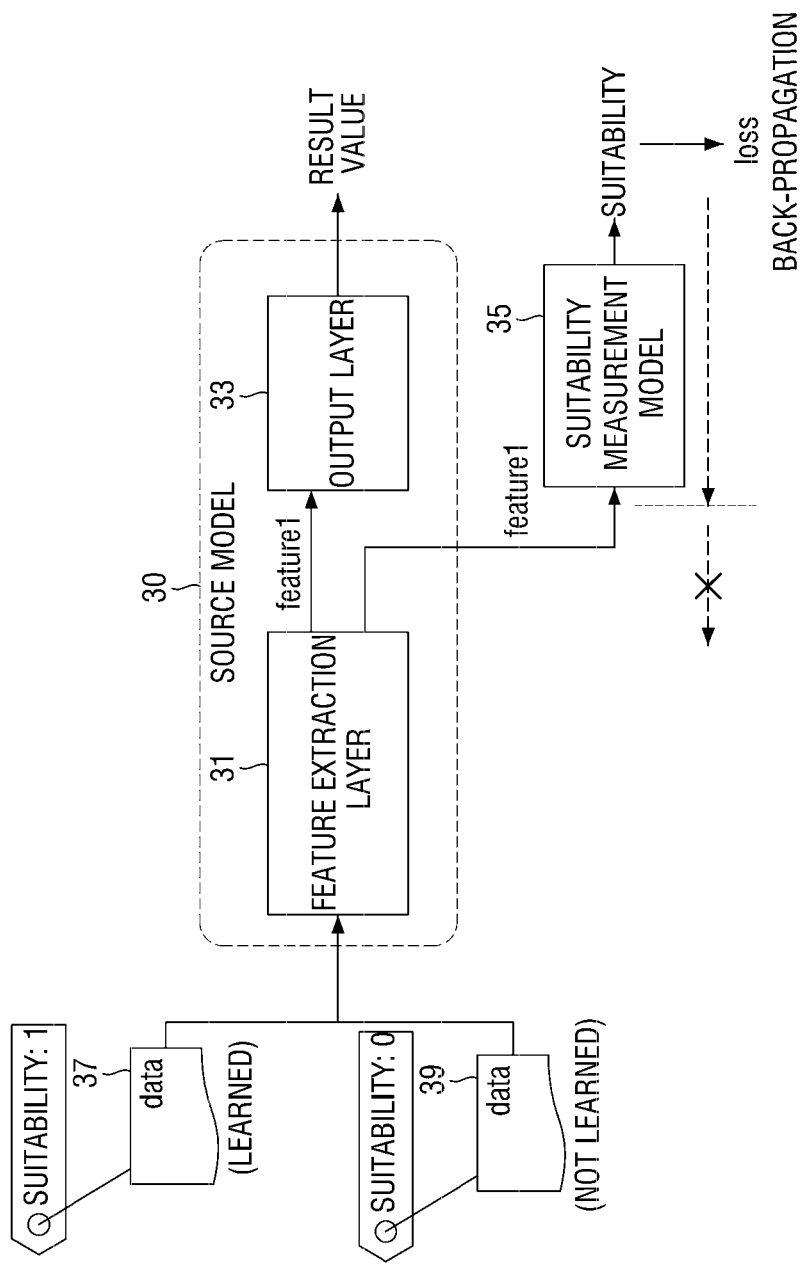

An example of a process of training the suitability measurement model 35 is illustrated in FIG. 10. Referring to FIG. 10, the learning apparatus 200 performs training by adjusting a weight of the model 35 by back-propagating a learning error (e.g., gradient of loss) of the first data 37 set to a high suitability value (e.g., 1) and the second data 39 set to a low suitability value (e.g., 0).

Here, since the training is performed on the suitability measurement model 35, the learning error is not back-propagated to the feature extraction layer 31. That is, in the above training process, only the weight of the suitability measurement model 35 is adjusted, and the weight of the feature extraction layer 31 is not adjusted.

A cross entropy function such as Equation 1 below may be used as a loss function for calculating the above error, but the technical scope of the present disclosure is not limited thereto.

$$L_d = (d \log \hat{d} + (1-d)\log(1-\hat{d})) \qquad (1)$$

In Equation 1, $L_d$ indicates an error value, d indicates preset suitability (i.e., right answer), and $\hat{d}$ indicates predicted suitability output from the suitability measurement model 35. The weight of the suitability measurement model 35 may be adjusted and updated in a direction to minimize the error calculated by Equation 1.

According to an embodiment, as illustrated in FIG. 10, the suitability measurement model 35 receives and learns a feature value of the dataset 37 and 39 extracted by the feature extraction layer 31 instead of directly receiving the dataset 37 and 39. Specifically, the suitability measurement model 35 receives a feature value extracted from the first data 37 and outputs predicted suitability for the feature value.

In addition, the weight of the suitability measurement model 35 is adjusted by back-propagating an error between the predicted suitability and preset suitability (e.g., 1). The reason for using a feature value instead of data is that the feature value is a high level of abstracted information extracted to distinguish input data and that similar features will be extracted from data having similar characteristics. For example, assuming that the suitability measurement model 35 has learned a feature value extracted by the feature extraction layer 31 and that a target dataset (e.g., 25 in FIG. 3) has similar characteristics to a first dataset learned by the source model 30, the feature extraction layer 31 will extract a feature value, which is similar to that of the first dataset, from the target dataset. Accordingly, the suitability measurement model 35 will output high suitability. Therefore, by learning the feature value, the suitability measurement model 35 can more accurately determine that the source model 30 is a model suitable for transfer learning to a target domain.

Figure 11:
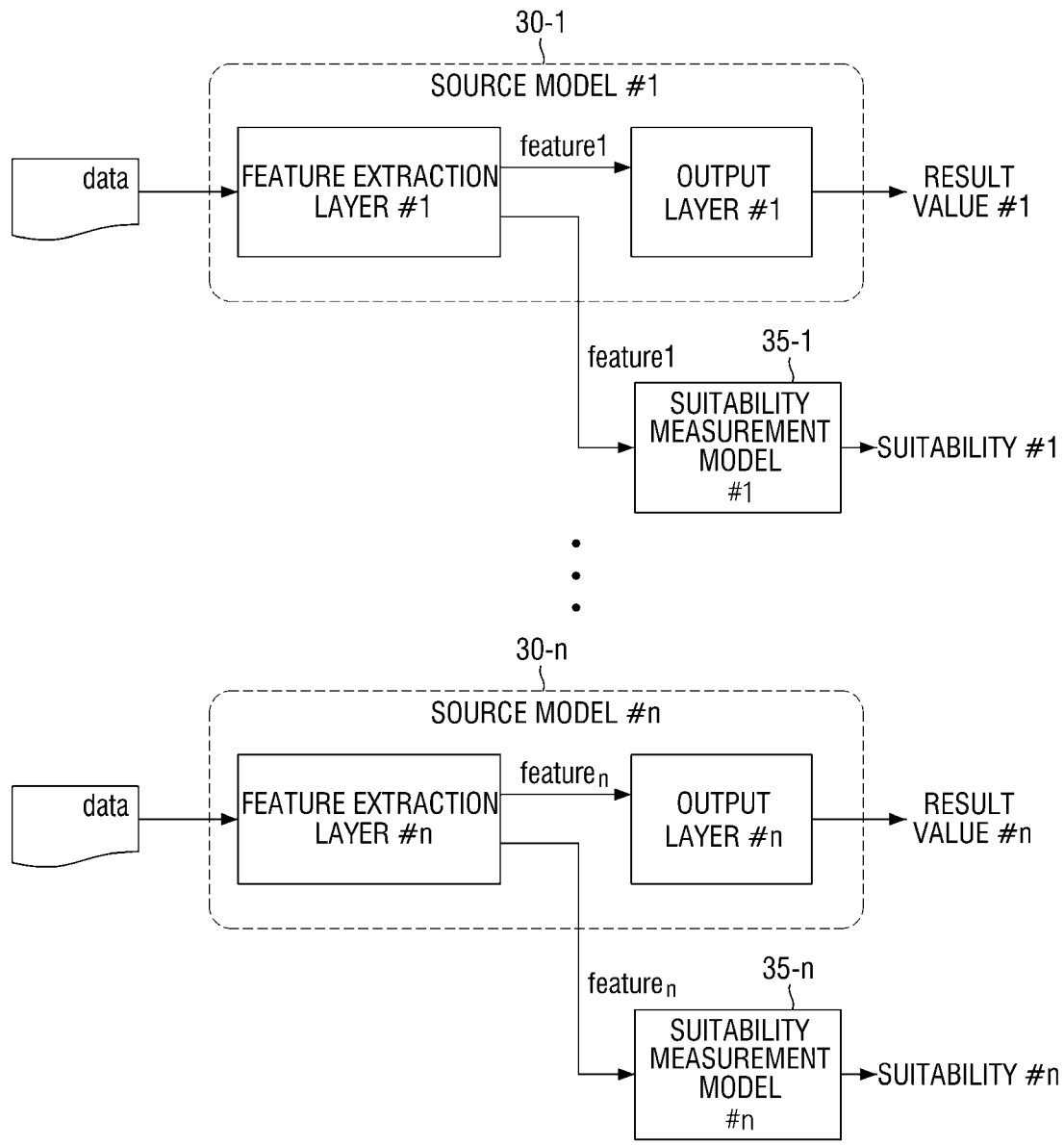

FIG. 11 illustrates suitability measurement models 35-1 through 35-n constructed for source models 30-1 through 30-n, respectively.

Referring to FIG. 11, the suitability measurement models 35-1 through 35-n may respectively be constructed for the source models 30-1 through 30-n in the same way as the suitability measurement model 35 described above. Specifically, a first suitability measurement model 35-1 may be constructed to measure the suitability of a first source model 30-1 for a target domain. An $n^{th}$ suitability measurement model 35-n may be constructed to measure the suitability of an $n^{th}$ source model 30-n.

Once the suitability measurement models 35-1 through 35-*n* are constructed for the source models 30-1 through 30-*n*, respectively, the learning apparatus 200 may determine a base model to be utilized for transfer learning based on measured values of the suitability measurement models 35-1 through 35-*n*. Specifically, the learning apparatus 200 may measure the suitability of the first source model 30-1 by inputting a feature value of a target dataset (e.g., 25 in FIG. 3) extracted by a first feature extraction layer to the first suitability measurement model 35-1. Likewise, the learning apparatus 200 may measure the suitability of the $n^{th}$ source model 30-*n* by inputting a feature value of the target dataset (e.g., 25 in FIG. 3) extracted by an $n^{th}$ feature extraction layer to the $n^{th}$ suitability measurement model 35-*n*. In addition, the learning apparatus 200 may determine a specific source model as the base model of the transfer learning based on the suitability of each source model.

Until now, the suitability measurement model and the process of constructing the suitability measurement model according to the first embodiment have been described with reference to FIGS. 7 through 11. A suitability measurement model and a process of constructing the suitability measurement model according to a second embodiment will now be described with reference to FIG. 12. For clarity of the specification, a description of elements and features identical to those of the previous embodiment will be omitted.

Figure 12:
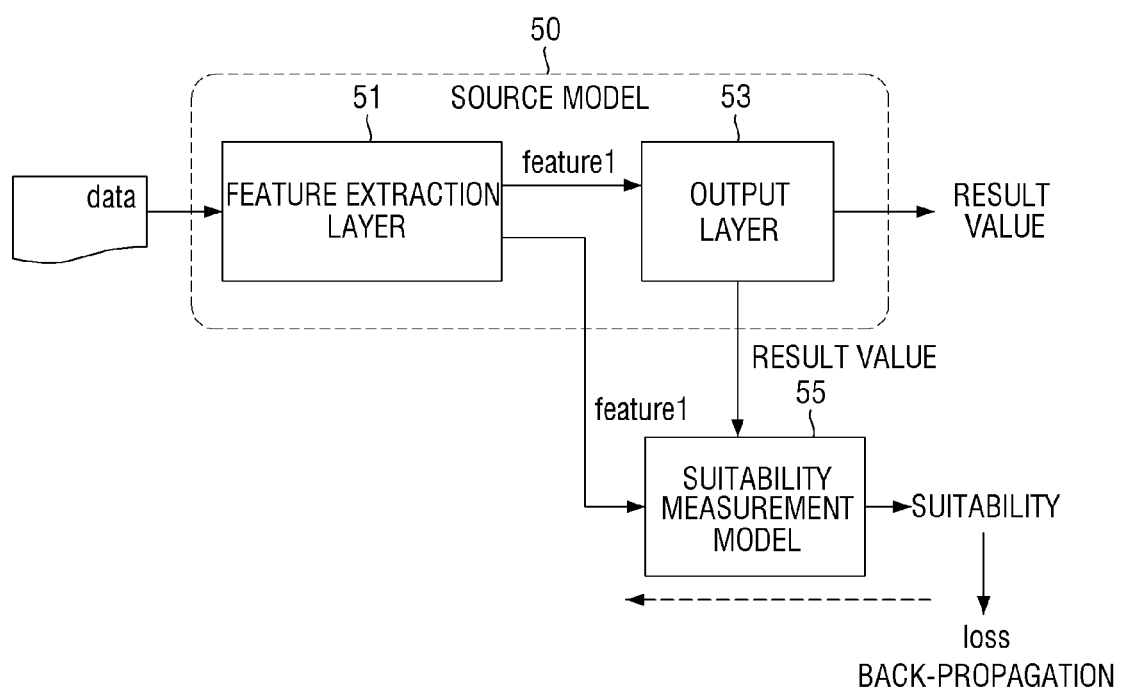
FIG. 12 illustrates a suitability measurement model and a process of constructing the suitability measurement model according to a second embodiment.

FIG. 12 illustrates a suitability measurement model and a process of constructing the suitability measurement model according to a second embodiment.

Referring to FIG. 12, in the second embodiment, a suitability measurement model 55 is trained by further using a result value (e.g., a classification result) of an output layer 53. That is, the suitability measurement model 55 is trained using a feature value of a training dataset extracted by a feature extraction layer 51 and a result value output from the output layer 53 as input data of the model 55. As described above, the training dataset includes first data previously learned by a source model 50 and second data not learned by the source model 50. Since the training process through back-propagation is the same as that of the first embodiment, a further description thereof is omitted.

A suitability measurement model and a process of constructing the suitability measurement model according to a third embodiment will now be described with reference to FIGS. 13 and 14. For clarity of the specification, a description of elements and features identical to those of the previous embodiments will be omitted.

Figure 13:
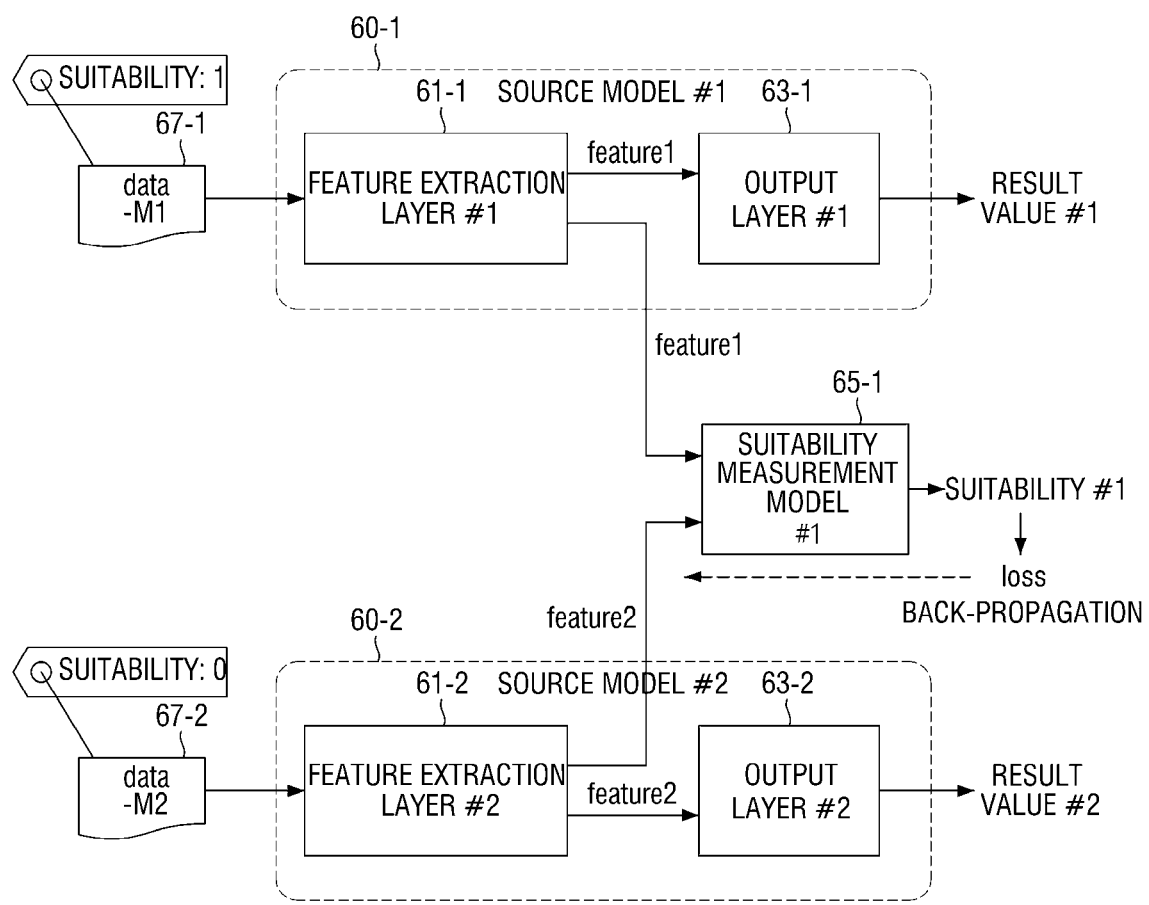
FIGS. 13 and 14 illustrate a suitability measurement model and a process of constructing the suitability measurement model according to a third embodiment.
Figure 14:
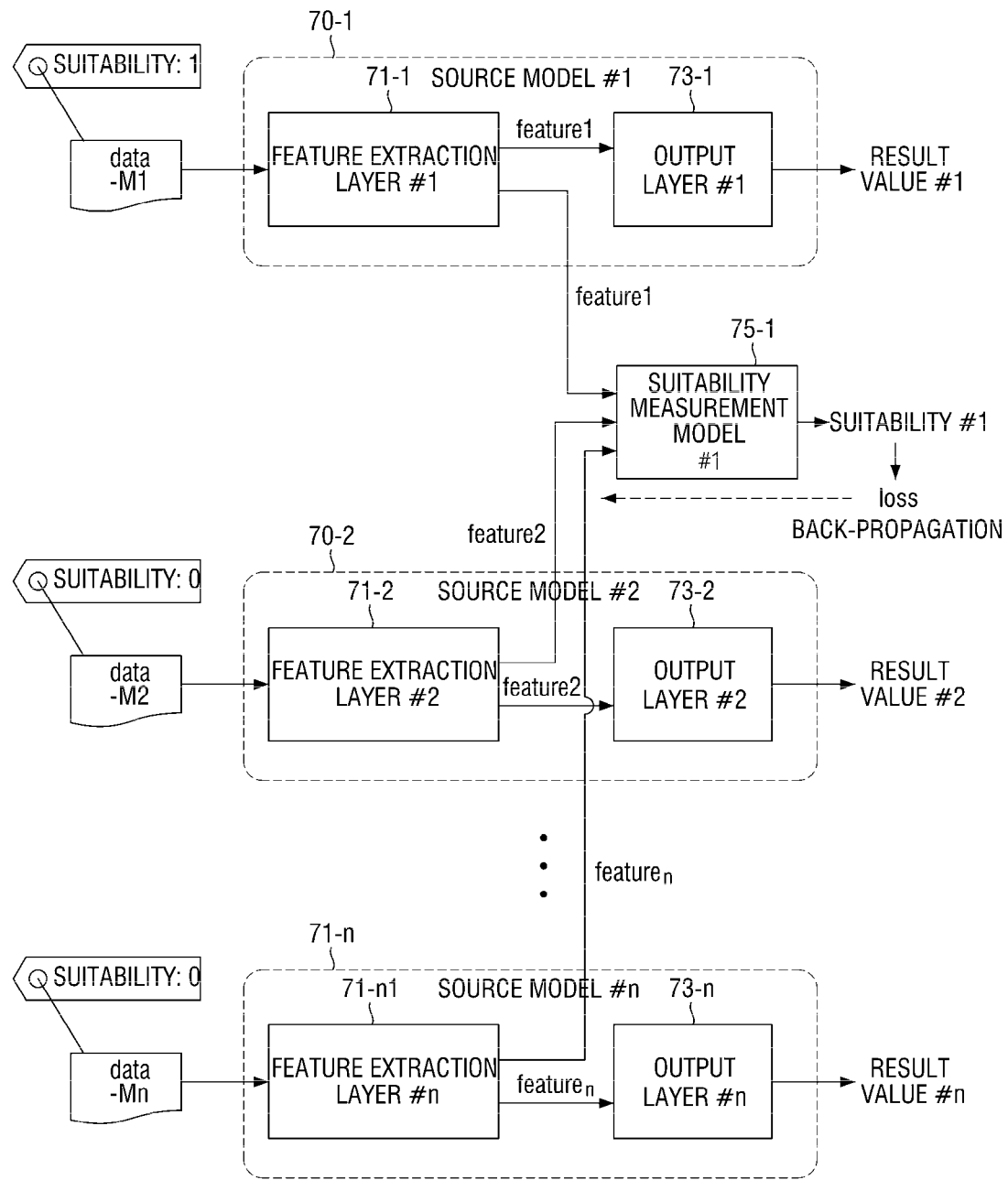

Referring to FIG. 13, the third embodiment relates to an example of training a suitability measurement model in conjunction with feature extraction layers 61-1 and 61-2 of a plurality of source models 60-1 and 60-2.

More specifically, a first suitability measurement model 65-1 may be trained as follows. The learning apparatus 200 adjusts a weight of the first suitability measurement model 65-1 by learning a feature value of first data 67-1 extracted by a first source model 60-1 as a high suitability value (e.g., 1). Here, the first data 67-1 is data previously learned by the first source model 60-1. For reference, $M_k$ shown in a figure (e.g., 67-1, 67-2) representing data in FIG. 13 and subsequent drawings indicates data previously learned by a $k^{th}$ source model.

Next, the learning apparatus 200 adjusts the weight of the first suitability measurement model 65-1 by further learning a feature value of the second data 67-2 extracted by a second source model 60-2 as a low suitability value (e.g., 0). Accordingly, the first suitability measurement model 65-1 can more clearly distinguish data previously learned by the first source model 60-1 and data not learned by the first source model 60-1. Here, the second data 67-2 is data previously learned by the second source model 60-2.

In addition, the learning apparatus 200 may further learn a feature value of data not previously learned by the first source model 60-1 as a low suitability value. Here, the feature value of the data not previously learned may be extracted by the first feature extraction layer 61-1 or the second feature extraction layer 61-2.

In some embodiments, the learning apparatus 200 may adjust the weight of the first suitability measurement model 65-1 by further learning a feature value of the first data 67-1 extracted by the second source model 60-2 as a low suitability value. This is performed because the feature value of the first data 67-1 extracted by the second source model 60-2 will be different from the feature value of the first data 67-1 extracted by the first source model 60-1.

In the current embodiment, since the first suitability measurement model 65-1 is a model for measuring the suitability of the first source model 60-1, a suitability measurement model may also be constructed for each of other source models (e.g., 60-2).

In FIG. 13, the first suitability measurement model 65-1 is trained in conjunction with two source models 60-1 and 60-2. However, the number of source models linked with the first suitability measurement models 65-1 may vary depending on embodiments. For example, referring to FIG. 14, a first suitability measurement model 75-1 may be trained in conjunction with n (where n is a natural number of 3 or more) source models 70-1 through 70-*n*. Even in this case, training may be performed in the same way as described above.

A suitability measurement model and a process of constructing the suitability measurement model according to a fourth embodiment will now be described with reference to FIG. 15. For clarity of the specification, a description of elements and features identical to those of the previous embodiments will be omitted.

Figure 15:
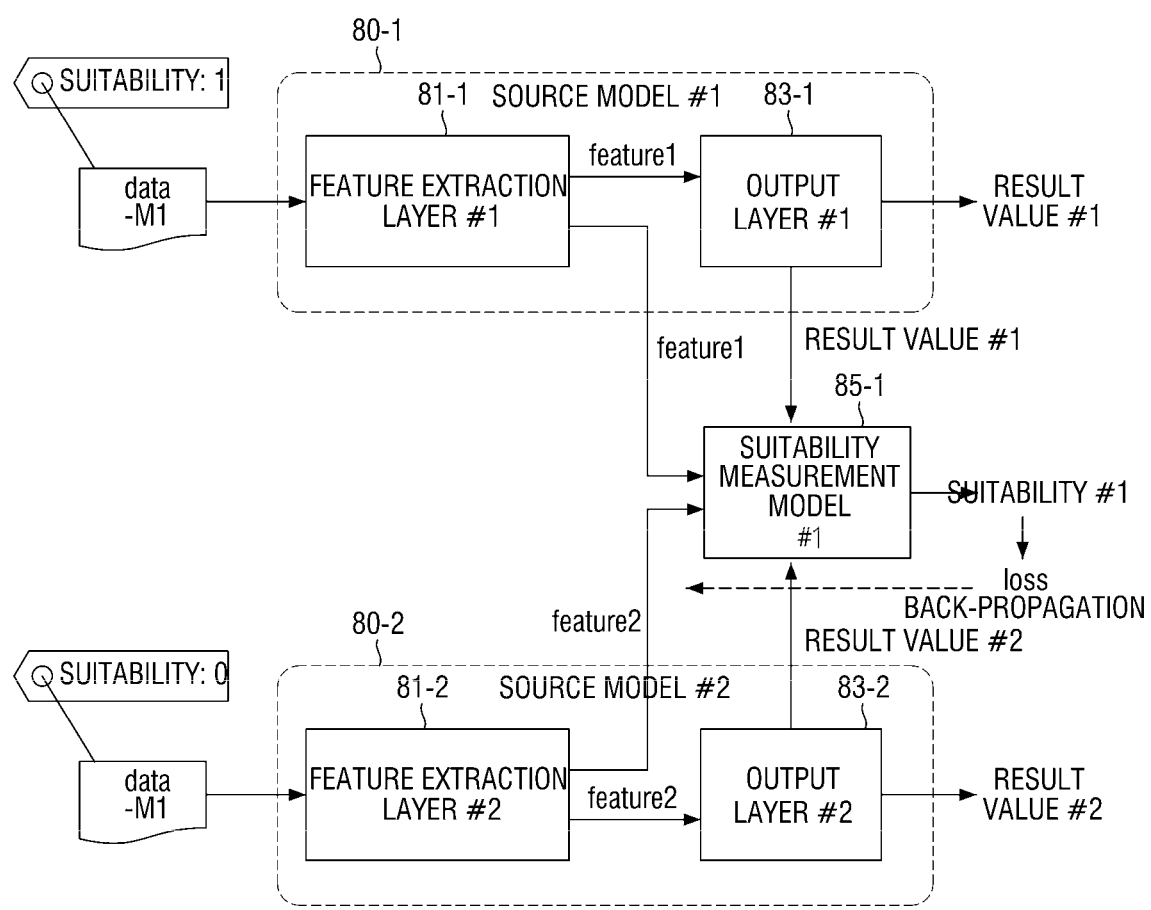
FIG. 15 illustrates a suitability measurement model and a process of constructing the suitability measurement model according to a fourth embodiment.

Referring to FIG. 15, the fourth embodiment is a combination of the second embodiment and the third embodiment described above. Specifically, in the fourth embodiment, a first suitability measurement model 85-1 is trained in conjunction with two or more source models 80-1 and 80-2, and the learning apparatus 200 performs training by using result values of output layers 83-1 and 83-2 in addition to feature values extracted by feature extraction layers 81-1 and 81-2.

Until now, the suitability measurement models and the processes of constructing the suitability measurement models according to the first through fourth embodiments have been described with reference to FIGS. 7 through 15. Suitability measurement models and processes of constructing the suitability measurement models according to fifth and sixth embodiments will now be described.

The fifth and sixth embodiments relate to a suitability measurement model that can measure suitability of a plurality of source models at a time.

First, a suitability measurement model and a process of constructing the suitability measurement model according to a fifth embodiment will now be described with reference to FIG. 16. For clarity of the specification, a description of elements and features identical to those of the previous embodiments will be omitted.

Figure 16:
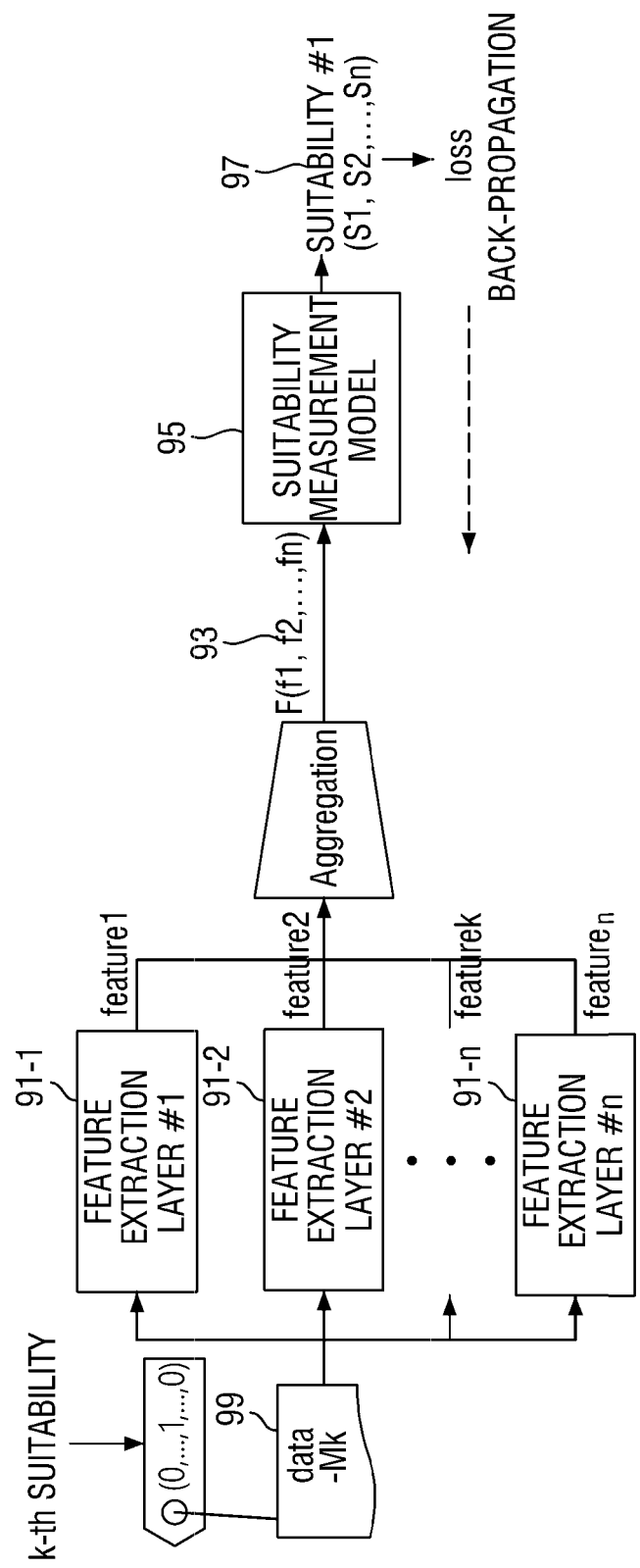
FIG. 16 illustrates a suitability measurement model and a process of constructing the suitability measurement model according to a fifth embodiment.

Referring to FIG. 16, a suitability measurement model 95 is trained in conjunction with feature extraction layers 91-1 through 91-*n* of a plurality of (hereinafter, assumed to be n)

source models in order to simultaneously measure suitability of the source models. A specific training process is as follows.

Training data 99 may include data previously learned by a specific source model or data not learned by the specific source model. In addition, suitability (i.e., right answer suitability) set in the training data 99 is suitability of each source model (i.e., a plurality of suitability values). Here, if the training data 99 is data previously learned by a $k^{th}$ source model, $k^{th}$ suitability among the suitability (i.e., right answer suitability) of each source model set in the training data 99 may be set to a high value (e.g., 1), and the other suitability may be set to a low value (e.g., 0). If the training data 99 is data not learned by any source model, the suitability of all source models is set to a low value.

In the current embodiment, the learning apparatus 200 extracts n feature values by inputting the training data 99 to the n feature extraction layers 91-1 through 91-*n* and generates an aggregate feature value 93 by aggregating the n feature values. Here, the operation of aggregating the n feature values may include an operation of concatenating or merging the n feature values and an operation of generating a new feature value based on the n feature values through predetermined processing. The operation of aggregating the n feature values may vary depending on the input layer structure of a suitability measurement model 95.

In some embodiments, when feature values are aggregated, a data compression or data reduction technique may be utilized. Since each feature value may be high-dimensional data (e.g., a high-dimensional feature map), aggregating the n feature values as they are may excessively increase the input dimension of the model 95. For this reason, the data compression or data reduction technique may be utilized. The data compression or data reduction technique may include, but is not limited to, a pooling technique such as global average pooling (GAP) or global max pooling (GMP).

When the aggregate feature value 93 is input, the suitability measurement model 95 outputs predicted suitability 97 for each source model, and the learning apparatus 200 performs training by adjusting a weight of the suitability measurement model 95 by back-propagating an error between the predicted suitability 97 and the right answer suitability. The suitability measurement model 95 constructed in this way outputs the suitability measured for each source model when a target dataset is input.

A suitability measurement model and a process of constructing the suitability measurement model according to a sixth embodiment will now be described with reference to FIG. 17. For clarity of the specification, a description of elements and features identical to those of the previous embodiments will be omitted.

Figure 17:
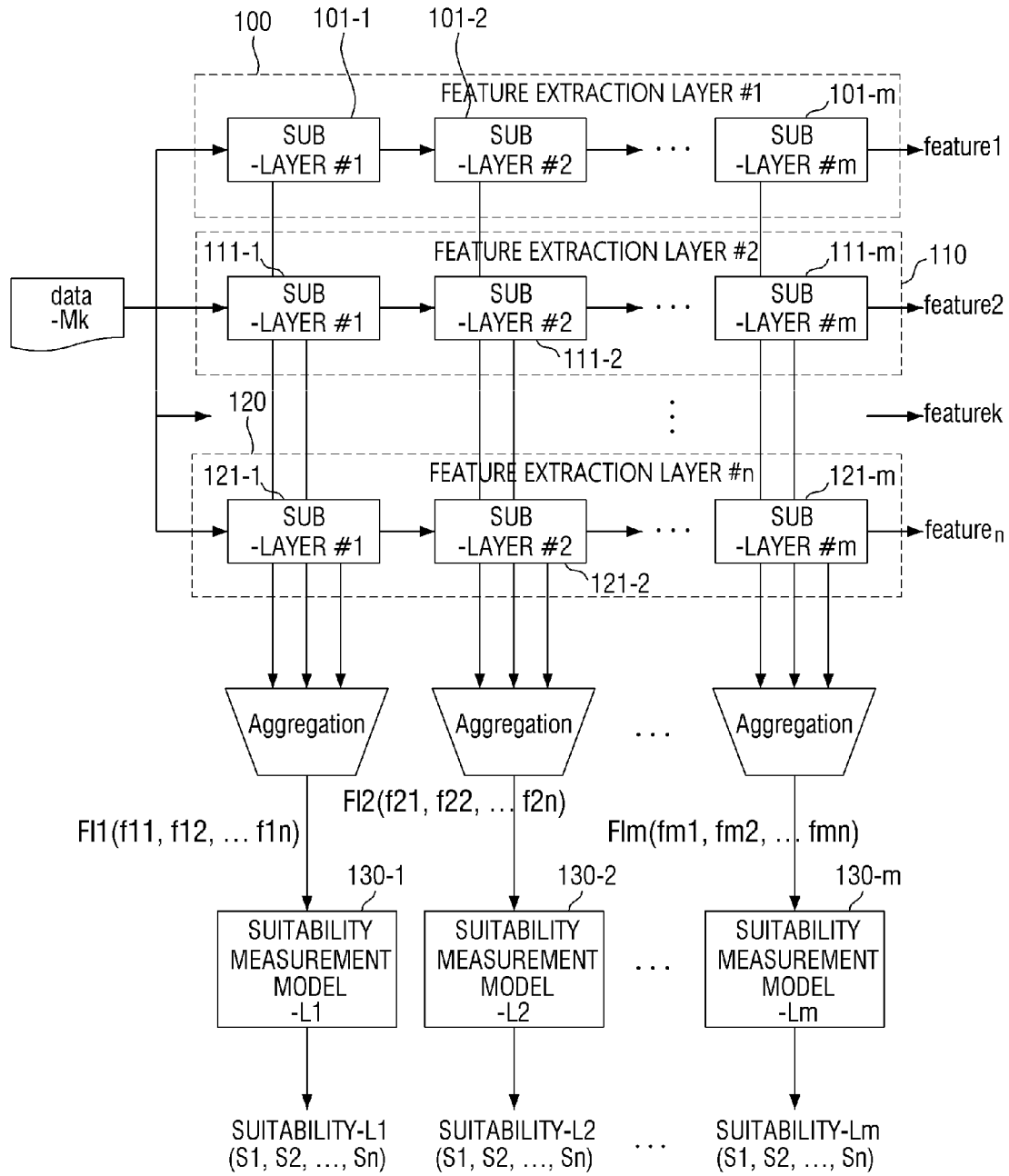
FIG. 17 illustrates a suitability measurement model and a process of constructing the suitability measurement model according to a sixth embodiment.

Referring to FIG. 17, the sixth embodiment is similar to the fifth embodiment described above but is different from the fifth embodiment in that suitability measurement models 130-1 through 130-*m* are constructed for sub-layers, respectively.

More specifically, the sixth embodiment is based on the assumption that a feature extraction layer 100, 110 or 120 of each source model is composed of a plurality of (hereinafter, assumed to be m) sub-layers. Here, the sub-layers may correspond to one or more hidden layers of a neural network model, but the technical scope of the present disclosure is not limited thereto.

In the current embodiment, the learning apparatus 200 generates aggregate feature values by aggregating features extracted by the sub-layers of the feature layers 100 through 120 and constructs m suitability measurement models 130-1 through 130-*m* by learning the aggregate feature values. For example, the learning apparatus 200 may generate a first aggregate feature value by aggregating feature values extracted by a plurality of first sub-layers 101-1 through 121-1 and construct a first suitability measurement model 130-1 for measuring the suitability of the first sub-layers 101-1 through 121-1 by learning the first aggregate feature value. Likewise, the learning apparatus 200 may generate an $m^{th}$ aggregate feature value by aggregating feature values extracted by a plurality of $m^{th}$ sub-layers 101-*m* through 121-*m* and construct an $m^{th}$ suitability measurement model 130-*m* for measuring the suitability of the $m^{th}$ sub-layers 101-*m* through 121-*m* by learning the $m^{th}$ aggregate feature value. The method of constructing each of the suitability measurement models 130-1 through 130-*m* is the same as that of the fifth embodiment described above, and thus a description thereof is omitted.

In the current embodiment, transfer learning suitability measured for each sub-layer is utilized for transfer learning. Specifically, the learning apparatus 200 may determine a sub-layer, which is most suitable for a target dataset among the first sub-layers 100-1 through 120-1, as a first base layer based on measured values of the first suitability measurement model 130-1 and determine a sub-layer, which is most suitable for the target dataset, among the $m^{th}$ sub-layers 100-*m* through 120-*m* as an $m^{th}$ base layer based on measured values of the $m^{th}$ suitability measurement model 130-*m*. Then, the learning apparatus 200 may transfer knowledge (i.e., learned weights) of the determined base layers to a target model, thereby constructing the target model. According to the current embodiment, since knowledge transfer is performed on a sub-layer-by-sub-layer basis rather than on a source model-by-source model basis, a more accurate target model can be constructed.

Until now, the suitability measurement models and the methods of constructing the suitability measurement models according to the various embodiments have been described with reference to FIGS. 7 through 17. According to the methods, it is possible to construct a neutral network model which, when a target dataset is given, accurately determines whether the target dataset is similar to data previously learned by a source model. Therefore, the neural network model can be utilized as a model for measuring suitability for transfer learning to a target domain, and a model which is to be the basis of transfer learning can be accurately determined using the neural network model. Further, the cost of constructing a target model can be reduced, and the accuracy of the target model can be improved.

However, it should be noted that the technical idea of the present disclosure is not limited to the above embodiments and can further include various combinations of the embodiments. For example, a suitability measurement model according to an embodiment may be constructed using an aggregate result value in addition to an aggregate feature value (i.e., a combination of the second embodiment and the fifth embodiment), and a suitability measurement model according to an embodiment may be constructed for each source model/sub-layer by using an individual feature value of each sub-layer (i.e., a combination of the first embodiment and the sixth embodiment). The method of constructing a suitability measurement model may be partially modified according to various combinations of the above-described embodiments. However, it should be noted that the technical scope of the present disclosure can include all of the various modifications described above.

FIG. 18 illustrates the hardware configuration of an example computing apparatus 300 that can implement the learning apparatus 200 according to the embodiment.

Referring to FIG. 18, the computing apparatus 300 may include one or more processors 310, a bus 350, a network interface 370, a memory 330 which loads a computer program to be executed by the processors 310, and a storage 390 which stores one or more computer programs 391. In FIG. 18 only the components related to the embodiment are illustrated. Therefore, it will be understood by those of ordinary skill in the art to which the present disclosure pertains that other general-purpose components can be included in addition to the components illustrated in FIG. 18.

The processors 310 control the overall operation of each component of the computing apparatus 300. The processors 310 may include a central processing unit (CPU), a microprocessor unit (MPU), a micro-controller unit (MCU), a GPU, or any form of processor well known in the art to which the present disclosure pertains. In addition, the processors 310 may perform an operation on at least one application or program for executing methods according to embodiments. The computing apparatus 300 may include one or more processors.

The memory 330 stores various data, commands and/or information. The memory 330 may load one or more programs 391 from the storage 390 in order to execute various methods/operations according to embodiments. The memory 330 may be implemented as, for example, a random-access memory (RAM).

When the programs 391 for executing the various methods/operations according to the embodiments are loaded into the memory 330, the modules illustrated in FIG. 4 may be implemented in the form of logic in the memory 330.

The bus 350 provides a communication function between the components of the computing apparatus 300. The bus 350 may be implemented as various forms of buses such as an address bus, a data bus and a control bus.

The network interface 370 supports wired and wireless Internet communication of the computing apparatus 300. In addition, the network interface 370 may support various communication methods other than Internet communication. To this end, the network interface 370 may include a communication module well known in the art to which the present disclosure pertains.

The storage 390 may non-temporarily store the programs 391. The storage 390 may include a nonvolatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The computer program 391 may include one or more instructions for controlling the processors 310 to perform methods/operations according to various embodiments when the computer program 391 is loaded into the memory 330. That is, the processors 310 may perform the methods/operations according to the various embodiments by executing the instructions.

For example, the computer program 391 may include one or more instructions for constructing a neural network model which measures transfer learning suitability of a plurality of pre-trained source models, measuring the transfer learning suitability of each of the source models by inputting data of a target domain to the neural network model, and determining a base model to be used for transfer learning among the source models based on the transfer learning suitability. In this case, a base model determination apparatus 200 for transfer learning may be implemented through the computing apparatus 300.

For another example, the computer program 391 may include one or more instructions for acquiring a training dataset which includes first data previously learned by a source model and second data not learned by the source model, adjusting a weight of a neural network model by learning the first data as first suitability, and adjusting the weight of the neural network model by learning the second data as second suitability. In this case, a neural network model construction apparatus 200 for measuring transfer learning suitability may be implemented through the computing apparatus 300.

Until now, the configuration and operation of the example computing apparatus 300 that can implement the learning apparatus 200 according to the embodiment have been described with reference to FIG. 18.

Until now, various embodiments of the present disclosure and the effects of the embodiments have been described with reference to FIGS. 1 through 18. However, the effects of the embodiments are not restricted to the one set forth herein. The above and other effects of the embodiments will become more apparent to one of daily skill in the art to which the embodiments pertain by referencing the claims.

The concept of the present disclosure described above with reference to FIGS. 1 through 18 can be implemented in computer-readable code on a computer-readable medium. The computer-readable recording medium may be, for example, a removable recording medium such as a compact disc (CD), a digital versatile disc (DVD), a Blu-ray disc, a universal serial bus (USB) storage device or a portable hard disk, or a fixed recording medium such as a ROM, a RAM or a computer-equipped hard disk. The computer program recorded on the computer-readable recording medium may be transmitted to another computing apparatus via a network such as the Internet and installed in the computing apparatus, and thus can be used in the computing apparatus.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method of determining a base model to be used for transfer learning to a target domain by a computing apparatus, the method comprising:

constructing a neural network model for measuring suitability of a plurality of pre-trained source models;
measuring the suitability of each of the pre-trained source models by inputting data of the target domain to the neural network model; and
determining the base model to be used for the transfer learning among the pre-trained source models based on the suitability,
wherein the constructing of the neural network model comprises:
extracting a feature value of a training data in conjunction with a first feature extraction layer of a first source model;
obtaining predicted suitability for the feature value by inputting the feature value to the neural network model; and
adjusting a weight of a first neural network model by back-propagating an error between preset first suitability and the predicted suitability.

2. The method of claim 1, wherein the adjusting of the weight of the first neural network model comprises:
obtaining a result value of the first source model by inputting the feature value to an output layer of the first source model; and
adjusting the weight of the first neural network model by learning the feature value and the result value as the first suitability.

3. The method of claim 1,
wherein a weight of the first feature extraction layer is not adjusted through the back-propagating of the error.

4. The method of claim 1, wherein the constructing of the neural network model comprises:
adjusting the weight of the first neural network model by learning first data previously learned by athe first source model as the first suitability; and
adjusting the weight of the first neural network model by learning second data not learned by the first source model as second suitability,
wherein the first suitability is set to a greater value than the second suitability.

5. The method of claim 1, wherein the constructing of the neural network model comprises:
constructing a second neural network model for measuring suitability of a second source model.

6. The method of claim 5, wherein the constructing of the second neural network model comprises:
extracting a second feature of second data in conjunction with a second feature extraction layer of the second source model; and
adjusting the weight of the first neural network model by learning the second feature as second suitability.

7. A method of determining a base model to be used for transfer learning to a target domain by a computing apparatus, the method comprising:
constructing a neural network model for measuring suitability of a plurality of pre-trained source models;
measuring the suitability of each of the pre-trained source models by inputting data of the target domain to the neural network model; and
determining the base model to be used for the transfer learning among the pre-trained source models based on the suitability,
wherein the constructing of the neural network model comprises:
extracting a plurality of feature values of training data in conjunction with respective feature extraction layers of the pre-trained source models;
aggregating the feature values; and
adjusting a weight of the neural network model by learning the aggregated feature values as suitability preset in the training data,
wherein the preset suitability comprises suitability of each of the pre-trained source models.

8. The method of claim 7, wherein each of the feature extraction layers comprises a first sub-layer and a second sub-layer, the aggregating of the feature values comprises aggregating a plurality of first feature values extracted by the respective first sub-layers of the pre-trained source models and aggregating a plurality of second feature values extracted by the respective second sub-layers of the pre-trained source models, and the adjusting of the weight of the neural network model comprises adjusting a weight of a first neural network model which corresponds to the first sub-layers by learning the aggregated first feature values and adjusting a weight of a second neural network model which corresponds to the second sub-layers by learning the aggregated second feature values.

9. The method of claim 8, wherein the determining of the base model comprises determining a first base layer among the first sub-layers of the pre-trained source models based on suitability measured by the first neural network model and determining a second base layer among the second sub-layers of the pre-trained source models based on suitability measured by the second neural network model, and further comprising constructing a target model, which is to be applied to the target domain, by using the first base layer and the second base layer.

10. The method of claim 1, further comprising constructing a target model, which is to be applied to the target domain, by fine-tuning the base model using a dataset of the target domain.

11. A method of constructing a neural network model for measuring suitability of a pre-trained source model by using a computing apparatus, the method comprising:
obtaining a training dataset which comprises first data previously learned by the pre-trained source model and second data not learned by the pre-trained source model;
adjusting a weight of the neural network model by learning the first data as first suitability; and
adjusting the weight of the neural network model by learning the second data as second suitability,
wherein the first suitability is set to a greater value than the second suitability,.
wherein the adjusting of the neural network model by learning the first data as the first suitability comprises:
extracting a feature value of the first data in conjunction with a feature extraction layer of the pre-trained source model;
obtaining predicted suitability for the feature value by inputting the feature value to the neural network model; and
adjusting the weight of the neural network model by back-propagating an error between the first suitability and the predicted suitability.

12. The method of claim 11, wherein the feature extraction layer comprises a convolutional layer.

13. The method of claim 11, wherein a weight of the feature extraction layer is not adjusted through the back-propagating of the error.

14. The method of claim 11, wherein the obtaining of the predicted suitability for the feature value comprises:

obtaining a result value of the pre-trained source model by inputting the feature value to an output layer of the pre-trained source model; and obtaining the predicted suitability by inputting the feature value and the result value to the neural network model.

15. The method of claim 11, wherein the pre-trained source model is a first source model, the training dataset further comprises third data previously learned by a second source model, and the adjusting of the weight of the neural network model by learning the first data as the first suitability comprises adjusting the weight of the neural network model by learning a feature of the first data extracted by a feature extraction layer of the first source model as the first suitability and further comprises adjusting the weight of the neural network model by learning a feature of the third data extracted by a feature extraction layer of the second source model as third suitability, wherein the first suitability is set to a higher value than the third suitability.

16. The method of claim 11, wherein the pre-trained source model is a first source model, and further comprising adjusting the weight of the neural network model by learning a feature of the first data extracted by a feature extraction layer of a second source model as third suitability, wherein the first suitability is set to a higher value than the third suitability.

17. The method of claim 11, wherein the pre-trained source model is a first source model, the first suitability comprises (1-1)-th suitability set for the first source model and (1-2)-th suitability set for a second source model, and the adjusting of the weight of the neural network model by learning the first data as the first suitability comprises:

extracting a first feature value of the first data by using a feature extraction layer of the first source model;

extracting a second feature value of the first data by using a feature extraction layer of the second source model;

aggregating the first feature value and the second feature value; and adjusting the weight of the neural network model by learning the aggregated feature values as the first suitability, wherein the (1-1)-th suitability is set to a higher value than the (1-2)-th suitability.

18. An apparatus for determining a base model to be used for transfer learning to a target domain, the apparatus comprising:

a memory which comprises one or more instructions; and a processor which executes the instructions to construct a neural network model for measuring suitability of a plurality of pre-trained source models, measure the suitability of each of the pre-trained source models by inputting data of the target domain to the neural network model, and determine the base model to be used for the transfer learning among the pre-trained source models based on the suitability, wherein the processor is configured to extract a feature value of a training data in conjunction with a first feature extraction layer of a first source model, obtain predicted suitability for the feature value by inputting the feature value to the neural network model, and adjust a weight of a first neural network model by back-propagating an error between preset first suitability and the predicted suitability.

* * * * *